(12) United States Patent
Ottosson et al.

(10) Patent No.: US 12,270,929 B2
(45) Date of Patent: Apr. 8, 2025

(54) SYSTEMS AND METHODS FOR LONG PULSE RADAR CHIRP DETECTOR FOR LTE LICENSED ASSISTED ACCESS DYNAMIC FREQUENCY SELECTION

(71) Applicant: Telefonaktiebolaget LM Ericsson (PUBL), Stockholm (SE)

(72) Inventors: David Ottosson, Karlstad (SE); Vinod Aduru, Nellore Andhra Pradesh (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 545 days.

(21) Appl. No.: 17/593,273

(22) PCT Filed: Mar. 18, 2019

(86) PCT No.: PCT/SE2019/050241
§ 371 (c)(1),
(2) Date: Sep. 14, 2021

(87) PCT Pub. No.: WO2020/190183
PCT Pub. Date: Sep. 24, 2020

(65) Prior Publication Data
US 2022/0196790 A1     Jun. 23, 2022

(51) Int. Cl.
*G01S 7/02*     (2006.01)
*G01S 7/35*     (2006.01)

(52) U.S. Cl.
CPC .............. *G01S 7/023* (2013.01); *G01S 7/021* (2013.01); *G01S 7/0232* (2021.05); *G01S 7/354* (2013.01); *G01S 7/356* (2021.05)

(58) Field of Classification Search
CPC ........ G01S 7/023; G01S 7/0232; G01S 7/021; G01S 7/354; G01S 7/356
See application file for complete search history.

(56) References Cited

U.S. PATENT DOCUMENTS 7,702,044 B2    4/2010    Nallapureddy et al.
9,429,642 B1 *   8/2016    Rezk ..................... H04B 1/123
(Continued)

FOREIGN PATENT DOCUMENTS

CN     105162571 A   *   12/2015
CN     108351405 A       7/2018
(Continued)

OTHER PUBLICATIONS

Compliance Measurement Procedures for Unlicensed-National Information Infrastructure Devices Operating in the 5250-5350 MHz and 5470-5725 MHz Bands Incorporating Dynamic Frequency Selection; Federal Communications Commission Office of Engineering and Technology Laboratory Division—Apr. 8, 2016.
(Continued)

*Primary Examiner* — Timothy A Brainard
*Assistant Examiner* — Samarina Makhdoom
(74) *Attorney, Agent, or Firm* — Baker Botts L.L.P.

(57) ABSTRACT

According to certain embodiments, a method by a network node for linear chirp detection includes obtaining a first number, N, of samples of a signal. The samples are divided into at least a first group and a second group, where the first group includes a second number, D, of the samples of the signal and the second group includes a third number, N−D, of the samples of the signal. A correlation is performed between the first group of samples and the second group of samples to generate a resultant group of samples of the signal. Within the resultant group of samples, a peak value is identified in the frequency domain Based on at least one property associated with the peak value, it is determined whether there is a linear chirp within the signal.

26 Claims, 23 Drawing Sheets

(56) References Cited

U.S. PATENT DOCUMENTS

| | | | |
|---|---|---|---|
| 2005/0059364 A1 | 3/2005 | Hansen et al. | |
| 2006/0258296 A1 | 11/2006 | Steer et al. | |
| 2011/0279307 A1* | 11/2011 | Song | G01S 13/282 342/134 |
| 2012/0229329 A1* | 9/2012 | Steer | G01S 7/021 342/173 |
| 2015/0323660 A1* | 11/2015 | Hampikian | G01S 13/347 342/109 |
| 2017/0307727 A1* | 10/2017 | Goda | G01S 13/584 |
| 2017/0318474 A1* | 11/2017 | Farshchian | G01S 7/021 |

FOREIGN PATENT DOCUMENTS

| | | | | |
|---|---|---|---|---|
| EP | 3438693 A1 * | 2/2019 | | G01S 13/26 |
| WO | 2013 074690 A1 | 5/2013 | | |
| WO | WO-2018102188 A1 * | 6/2018 | | G01S 13/18 |

OTHER PUBLICATIONS

International Search Report issued for International application No. PCT/SE2019/050241—Nov. 18, 2019.

PCT Written Opinion of the International Searching Authority issued for International application No. PCT/SE2019/050241—Nov. 18, 2019.

Chirp Signal Detection Using FFT Peak Frequency Difference, Correspondence; IEEE Transactions on Aerospace and Electronic Systems, vol. 52, No. 3—Jun. 2016.

EPO Communication pursuant to Article 94(3) EPC issued for Application No. 19 714 254.0-1206—Aug. 25, 2023.

Official Action issued for Chinese Patent Application No. 201980094314.3—Jun. 28, 2024.

Search Report issued for Chinese Patent Application No. 2019800943143—Jun. 26, 2024.

* cited by examiner

SYSTEMS AND METHODS FOR LONG PULSE RADAR CHIRP DETECTOR FOR LTE LICENSED ASSISTED ACCESS DYNAMIC FREQUENCY SELECTION

PRIORITY

This nonprovisional application is a U.S. National Stage Filing under 35 U.S.C. § 371 of International Patent Application Serial No. PCT/SE2019/050241 filed Mar. 18, 2019 and entitled "SYSTEMS AND METHODS FOR LONG PULSE RADAR CHIRP DETECTOR FOR LTE LICENSED ASSISTED ACCESS DYNAMIC FREQUENCY SELECTION" which is hereby incorporated by reference in its entirety.

BACKGROUND

As the 2.4 GHz band becomes more crowded, many users are opting to use the 5 GHz band. This not only provides more spectrum, but the 5 GHz band is not as widely used by WiFi and many appliances, including items such as, for example, microwave ovens.

In many countries, regulatory requirements may limit the number of 5 GHz channels available or place additional restrictions on their use because the spectrum is shared with other technologies and services. For example, for parts of band 46, there are regional requirements aiming at protecting radars from interference by other users of the spectrum.

DFS (Dynamic Frequency Selection) is a mechanism that allows a device to coexist with radar systems. DFS automatically selects a frequency that does not interfere with the radar systems. DFS allows you to use more channels. The DFS involves radar detection and selection of frequency without radar.

Since the coexistence between LTE and radar applications at the same frequency bands recently has been enabled through Licensed Assisted Access (LAA), the technical applications to be used as plugin to detect radar in LTE systems are limited. For LTE, such a plugin must be incorporated in the Radio Base Station between the Radio Unit and the medium access control (MAC) control layer with high demands on processing efficiency and accuracy. Since the frequency properties of a chirped signal are preferably analyzed through Fast Fourier Transforms (FFTs), the chirp detection algorithm will utilize the same FFT accelerators as regular traffic does in an Orthogonal Frequency Division Multiple Access (OFDMA) system such as, for example, LTE. As such, it is important to reduce the processing done in frequency domain while still maintaining good detection performance.

SUMMARY

To address the foregoing problems with existing solutions, disclosed are systems and methods that provide a tunable detector for detection of linear chirped radar signals in Orthogonal Frequency Division Multiple Access (OFDMA) based systems.

According to certain embodiments, a method by a network node for linear chirp detection includes obtaining a first number, N, of samples of a signal. The samples are divided into at least a first group and a second group, where the first group includes a second number, D, of the samples of the signal and the second group includes a third number, N–D, of the samples of the signal. A correlation is performed between the first group of samples and the second group of samples to generate a resultant group of samples of the signal. Within the resultant group of samples, a peak value is identified in the frequency domain. Based on at least one property associated with the peak value, it is determined whether there is a linear chirp within the signal.

According to certain embodiments, a network node for linear chirp detection includes memory storing instructions and a processor operable to execute the instructions to cause the network node to obtain a first number, N, of samples of a signal. The network node divides the samples into at least a first group and a second group, where the first group includes a second number, D, of the samples of the signal and the second group includes a third number, N–D, of the samples of the signal. The network node performs a correlation between the first group of samples and the second group of samples to generate a resultant group of samples of the signal. Within the resultant group of samples, a peak value is identified in the frequency domain. Based on at least one property associated with the peak value, the network node determines whether there is a linear chirp within the signal.

According to certain embodiments, a non-transitory computer-readable storage medium storing instructions is operable to be executed by a processor to cause the processor to obtain a first number, N, of samples of a signal. The samples are divided into a first group and a second group. The first group includes a second number, D, of the samples of the signal, and the second group includes a third number, N–D, of the samples of the signal. Correlation is performed between the first group of samples and the second group of samples to generate a resultant group of samples of the signal. Within the resultant group of samples, a peak value is identified in the frequency domain. Based on at least one property associated with the peak value, it is determined whether there is a linear chirp within the signal.

Certain embodiments of the present disclosure may provide one or more technical advantages. For example, certain embodiments may provide effective utilization of the unlicensed band, which is a critical task in modern communications.

Radar detection plays a major role in the selection of the DFS required frequency band. Another advantage may be that certain embodiments detect the presence of a linear chirp in the received baseband signal. By analyzing the received radio signal for chirped like characteristics it is possible to distinguish a chirped like emitted radar signal from WiFi traffic and accordingly avoid false alarms with predominant WiFi interference scenarios.

Still another advantage may be that certain embodiments use the correlation along with the frequency analysis for the detection of the chirp characteristics.

Yet another advantage may be that certain embodiments provide the approximate band width of the chirp.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide solutions providing a tunable detector for the detection of linear chirped radar signals in Orthogonal Frequency Division Multiple Access (OFDMA) based systems. Specifically, since no chirped signal characteristics are present in OFDMA based devices, an optimal chirp detection algorithm efficiently filters out all chirped like signal devices, like radars, from OFDM based devices in frequency bands where both systems shall co-exist without interfering each other.

According to certain embodiments described herein, a method is provided to facilitate an easy tunable detection algorithm for estimation and detection of linear chirps where the computation complexity in the algorithm is scalable and thus could be made more efficient in comparison to existing market solutions. The latter is made possible by decimation of received time domain chirp samples and by only requiring one Discrete Fourier Transform (DFT) to detect and estimate the chirp characteristics. By contrast, in current market solutions, several DFTs are utilized and executed at a sampling frequency covering the whole maximum bandwidth of the chirp. However, the methods and techniques described herein replace the multi-DFTs with one operation in time domain using correlation along with one DFT for frequency analysis. This provides a more efficient digital signal processor (DSP) implementation since it consists of complex multiplications followed by one DFT operation.

According to certain embodiments, the time domain operation may reduce the bandwidth of the chirp such that the sampling period may be decreased, which thereby reduces the computation complexity in the preceding calculation steps in the algorithm. The described time domain operation may also effectively filter out the bandwidth of the chirp in opposite to existing market solutions where several DFTs operations are followed by an estimation block where the DFTs are analyzed to detect if a linearly increase of the frequency is present.

Figure 1:
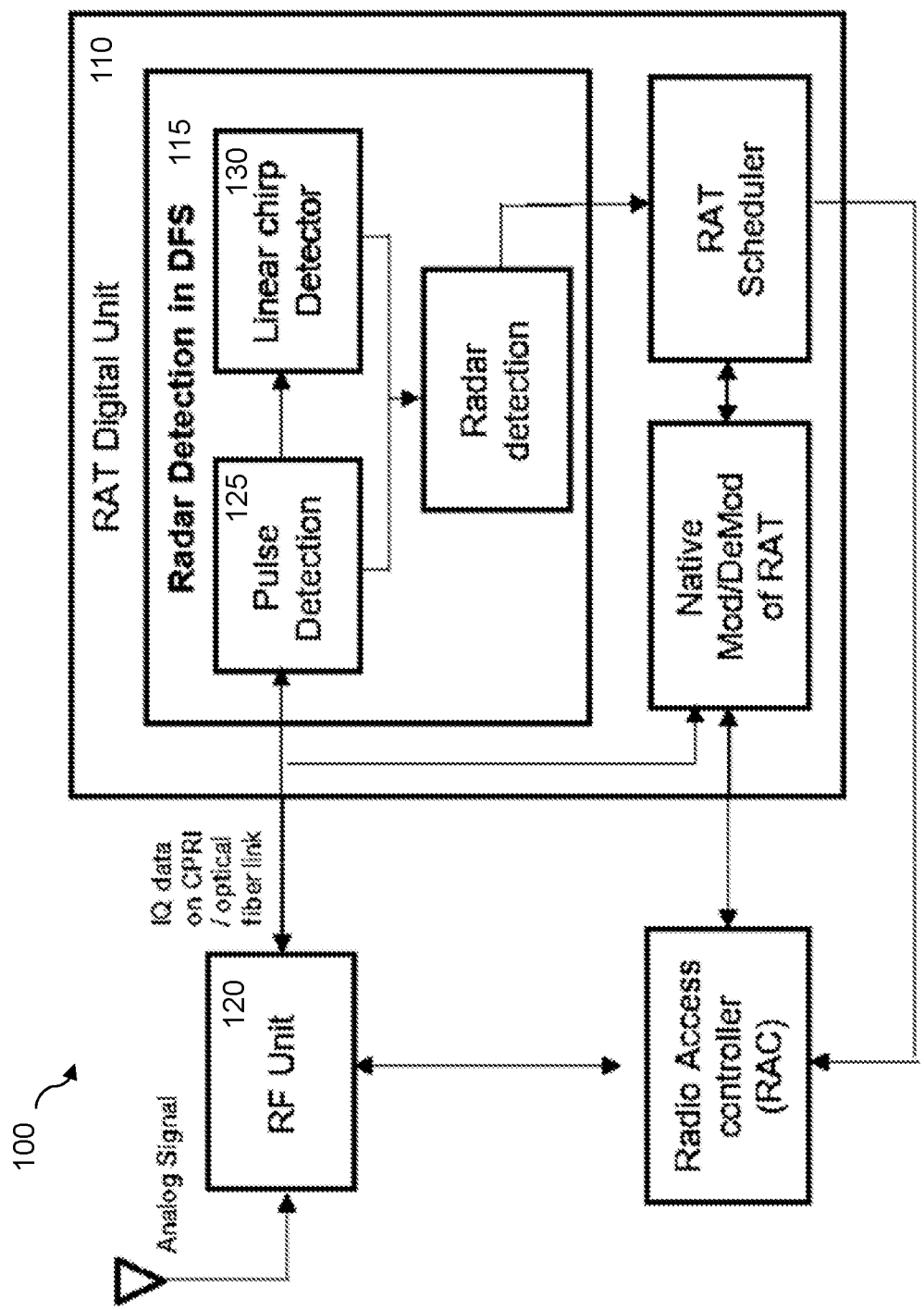
FIG. 1 illustrates an example context for a DFS (Dynamic Frequency Selection) algorithm in a Radio Access Technology (RAT) receiver, according to certain embodiments.

Particular embodiments are described in FIGS. 1-25 of the drawings, like numerals being used for like and corresponding parts of the various drawings. FIG. 1 illustrates an example context 100 for a dynamic frequency selection (DFS) algorithm in a Radio Access Technology (RAT) digital unit 110, according to certain embodiments. In a particular embodiment, the RAT digital unit 110 is a RAT transceiver.

The Radar detector 115 performs an integral part of the DFS algorithm that is to be implemented in the RAT transceiver together with the native RAT channel estimation, modulator/demodulator and encoding/decoding modules. The radar detector operates on the digitalized complex radio frequency (RF) samples received over Common Public Radio Interface (CPRI) or an optical fiber link from the RF unit 120. According to certain embodiments described herein, a detector is provided that detects whether an intercepted linear chirp is present in the RF samples. The detector 125 is preceded by a Pulse Detection block 130 that detects that energy has been detected for a short time duration. The short time duration of energy followed by a silent period that then repeat itself characterizes a potential intercepting radar signal in the RF samples.

Figure 2:
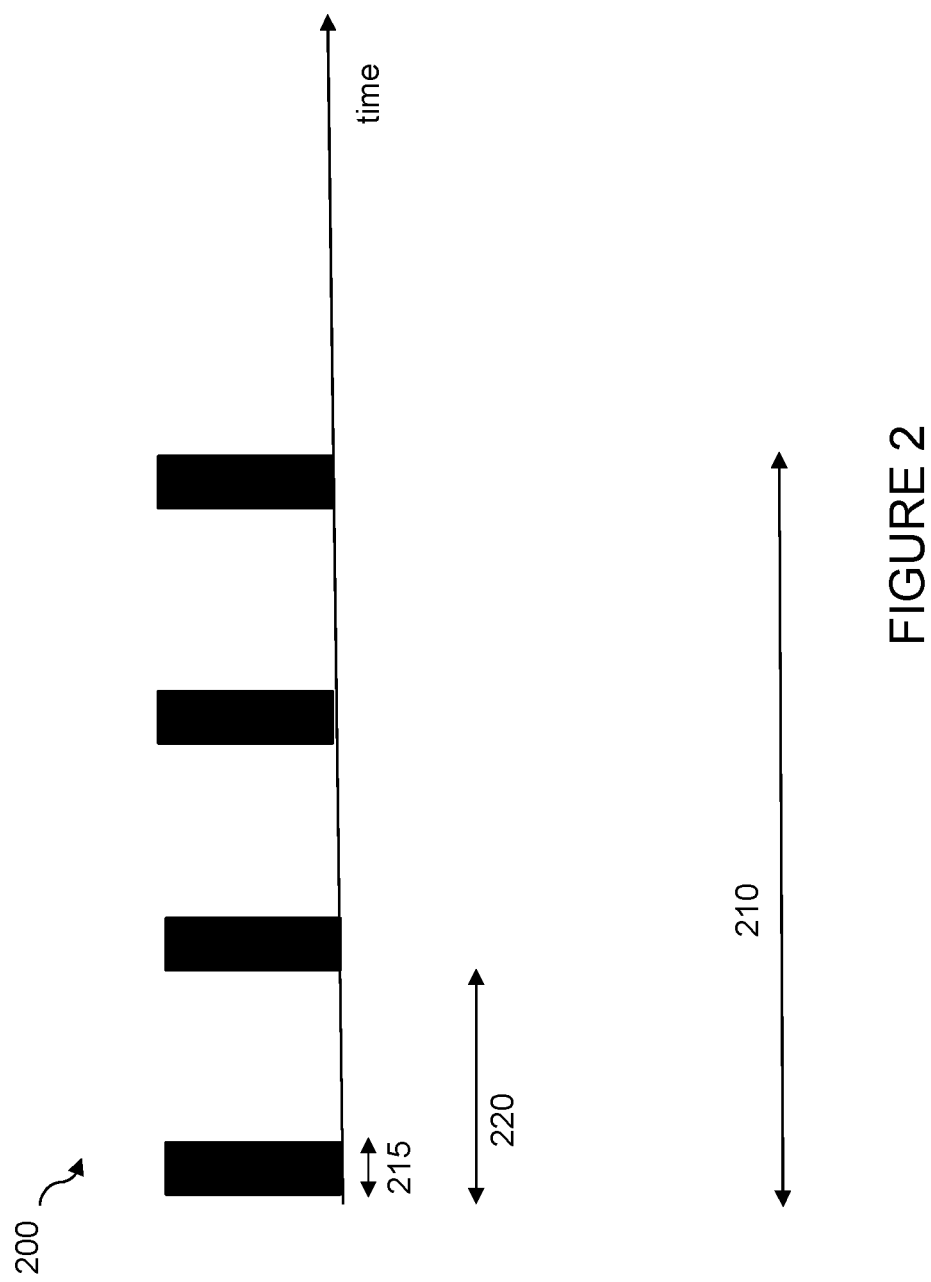
FIG. 2 illustrates a graph demonstrating example time characteristics of a radar signal, according to certain embodiments.

FIG. 2 is a graph 200 demonstrating example time characteristics of a radar signal, according to certain embodiments. As depicted, the radar signal includes a burst 210 of pulses of a pulse width of 215, which are repeated according to a pulse repetition interval 220.

If the pulse widths 210 are around the transmission length in a time division duplex (TDD) system, the pulse detection block cannot distinguish whether the pulse train origin from a TDD system like WiFi or from a radar source. But for long pulse radar, the pulses are modulated by a linear chirp that characterizes the source. If a chirp is detected it can be used as condition to judge the type of intercepting source.

According to certain embodiments, a linear chirp detector, as disclosed herein, provides an easily implementable and efficient detector to avoid false triggers on other sources than radar. This is crucial since a falsely detected radar source causes the radio access controller (RAC) portion of the DFS algorithm to shut down the operating carrier for thirty minutes according to FCC rules.

For example, and as depicted in FIG. 1, the digital unit 110 in the RAT transceiver receives the complex RF samples and stores it for further processing. According to certain embodiments, the received complex signal, which may be a full radar pulse or a partial part of a radar pulse, is divided into at least two groups of signals. In a particular embodiment, each of the at least two groups of signals may be of the same duration and length. In another embodiment, the at least two groups of signals may have different durations. In this scenario, the resulting group of samples may equal the group with the shortest duration such that M=min(N−D, D).

In case of multi antenna configuration, the chirp detection can be performed on antenna combined sample, in a particular embodiment. Stated differently, the samples received on different antennas may be combined. The combined samples may then be used for further processing, according to certain particular embodiments. This may be done in the DU, and the combined samples may be fed to the radar detection. It is recognized, however, that this antenna combing is an optional step that is not mandatory.

Though the steps performed for pulse detection by pulse detector 125 are not described in detail, the pulse detector 125 may detect pulses by comparing the intercepted signal power against a threshold and once a pulse is found this is used as a trigger for the linear chirp detector 130. The pulse detector 125 then delivers the samples of received pulses to the chirp detector 130.

By performing correlation, the chirp detector 130 may then determine the phase change. For example, in a particular embodiment where the group of samples includes at least a first group of samples and a second of samples, the phase change may be determined by performing elementwise complex multiplication between the first group of samples and the conjugate of second group of samples. In case of linear chirp, the rate of change of phase is constant between the at least two groups of samples, which forms a sinusoidal wave with the half of the frequency change in the linear chip intercepted.

Figure 3:
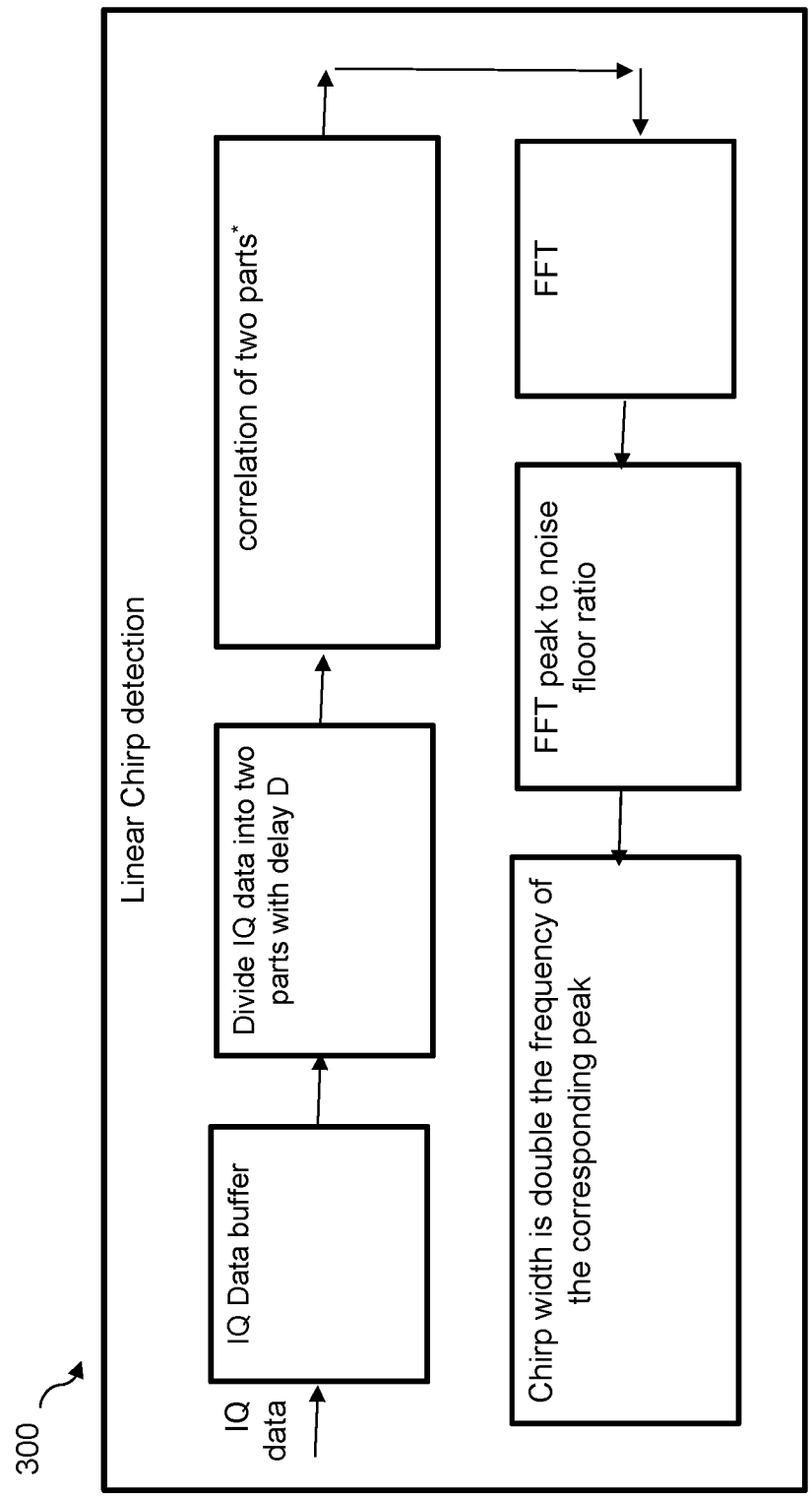
FIG. 3 illustrates an example block diagram of a linear chirp detection method, according to certain embodiments.

One way to detect the linear chirp radar is to identify the linearity in the frequency change in the intercepted signal. According to certain embodiments, a method is provided that uses the digitized time domain samples of the chirp signal. FIG. 3 illustrates an example block diagram 300 of a linear chirp detection method, according to certain embodiments. As shown, the method includes following steps in the process of chirp detection:

1. Buffering of N complex/real samples that contain the chirp signal.
2. Dividing the buffered IQ data into at least two groups of samples with some duration that may be D samples divided by the sample rate.
3. Find the correlation of the at least two groups of samples.
4. Find the frequency properties of the correlation using Fast Fourier Transform (FFT). Optionally, non-coherent combinf of FFT can be performed to improve the noise.
5. Compare the peak observed in the FFT, and compared against a threshold to declare as chirp and chirp width.

A linearly chirped signal in time domain is defined as a complex signal with a linearly increasing frequency as shown in Equation 1:

$$g(t)=e^{j\omega(t)t}=\cos(\omega(t)t)+j\sin(\omega(t)t)$$

As shown in Equation 2, the phase of the chirped signal is a function of $\omega(t)t$ where its frequency is given by:

$$f(t) = \frac{1}{2\pi}\frac{d(\omega(t)t)}{dt}$$

By defining in Equation 3:

$$\omega(t)t = \Phi(t) \stackrel{def}{=} 2\pi f_c t + \frac{2\pi\beta t^2}{2T}$$

where $f_c$ is the starting frequency, $\beta$ is chirp width and T is the chirp duration, the frequency will be a linear function of t as shown in Equation 4:

$$\frac{d\Phi}{dt} = \frac{d}{dt}\left(2\pi f_c t + \frac{2\pi\beta t^2}{2T}\right) = \omega_c + \frac{\omega_\beta t}{T}$$

From Equation 4, it may be concluded that during the chirp duration, T, the frequency is sweeping from $f_c$ to $f_c+\beta$.

Figure 4:
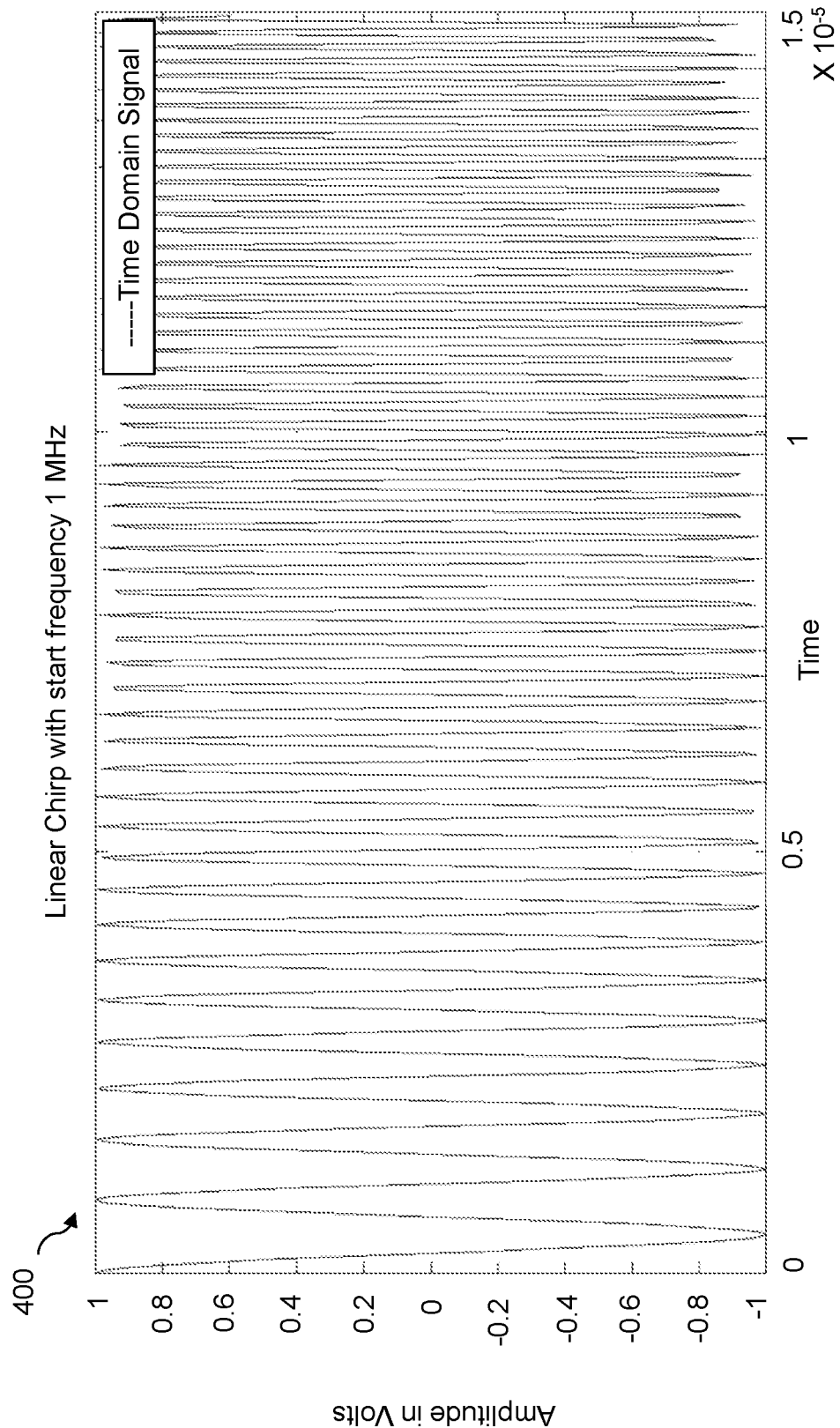
FIG. 4 illustrates an example graph of time domain of a linear chirp, according to certain embodiments.

FIG. 4 illustrates an example graph 400 of time domain of a linear chirp, according to certain embodiments. Specifically, FIG. 4 shows a linear chirp signal with start frequency, $f_c$, of 1 MHz and chirp duration of 15 microseconds.

Figure 5:
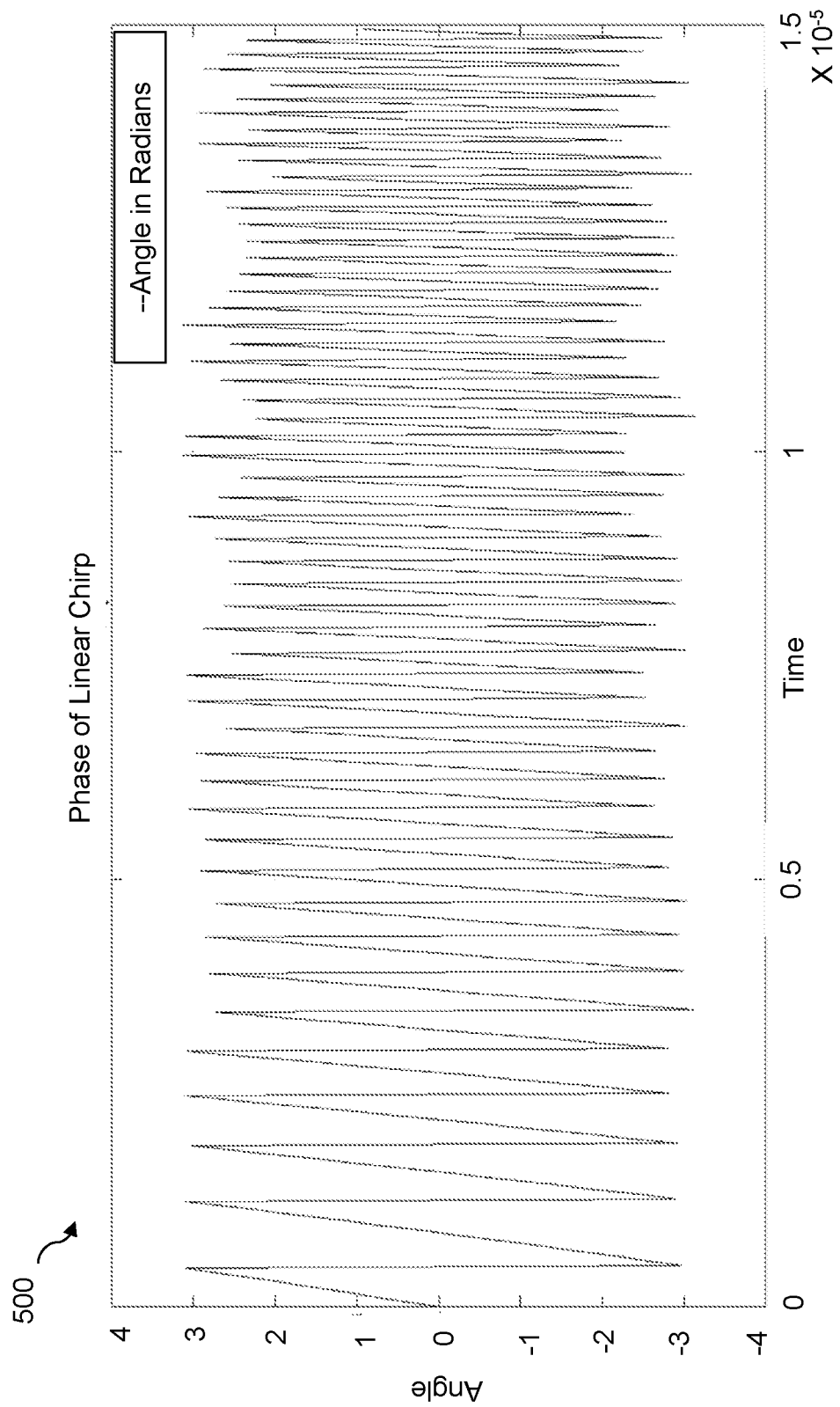
FIG. 5 illustrates an example graph of instantaneous phase of a linear chirp, according to certain embodiments.
Figure 6:
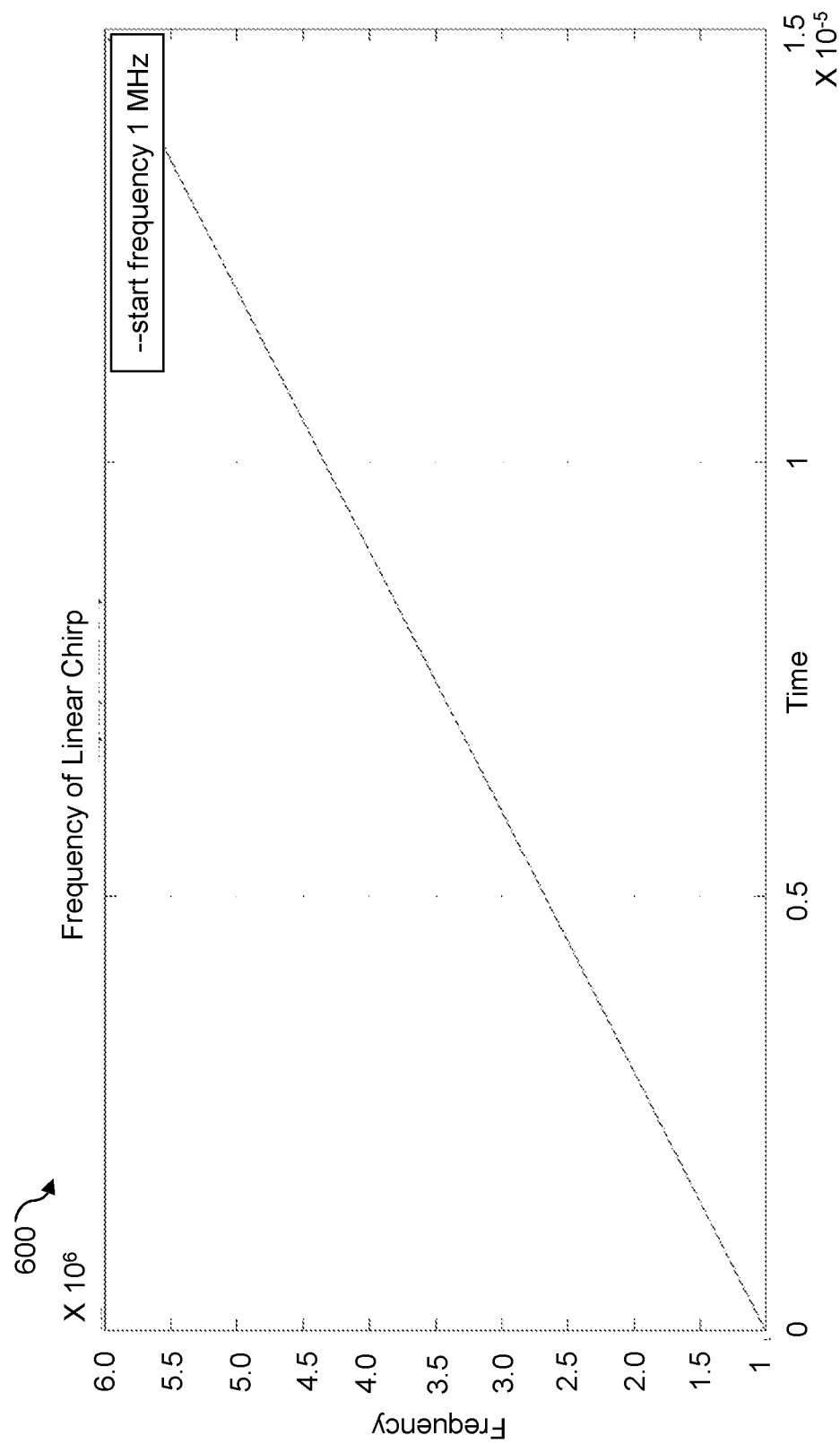
FIG. 6 illustrates an example graph of instantaneous frequency of a linear chirp, according to certain embodiments.

FIG. 5 illustrates an example graph 500 of instantaneous phase of a linear chirp, according to certain embodiments, and FIG. 6 illustrates an example graph 600 of instantaneous frequency of a linear chirp, according to certain embodiments. The instantaneous frequency is started from 1 MHz and ended at 6 MHz as the chirp width is 5 MHz.

Figure 7:
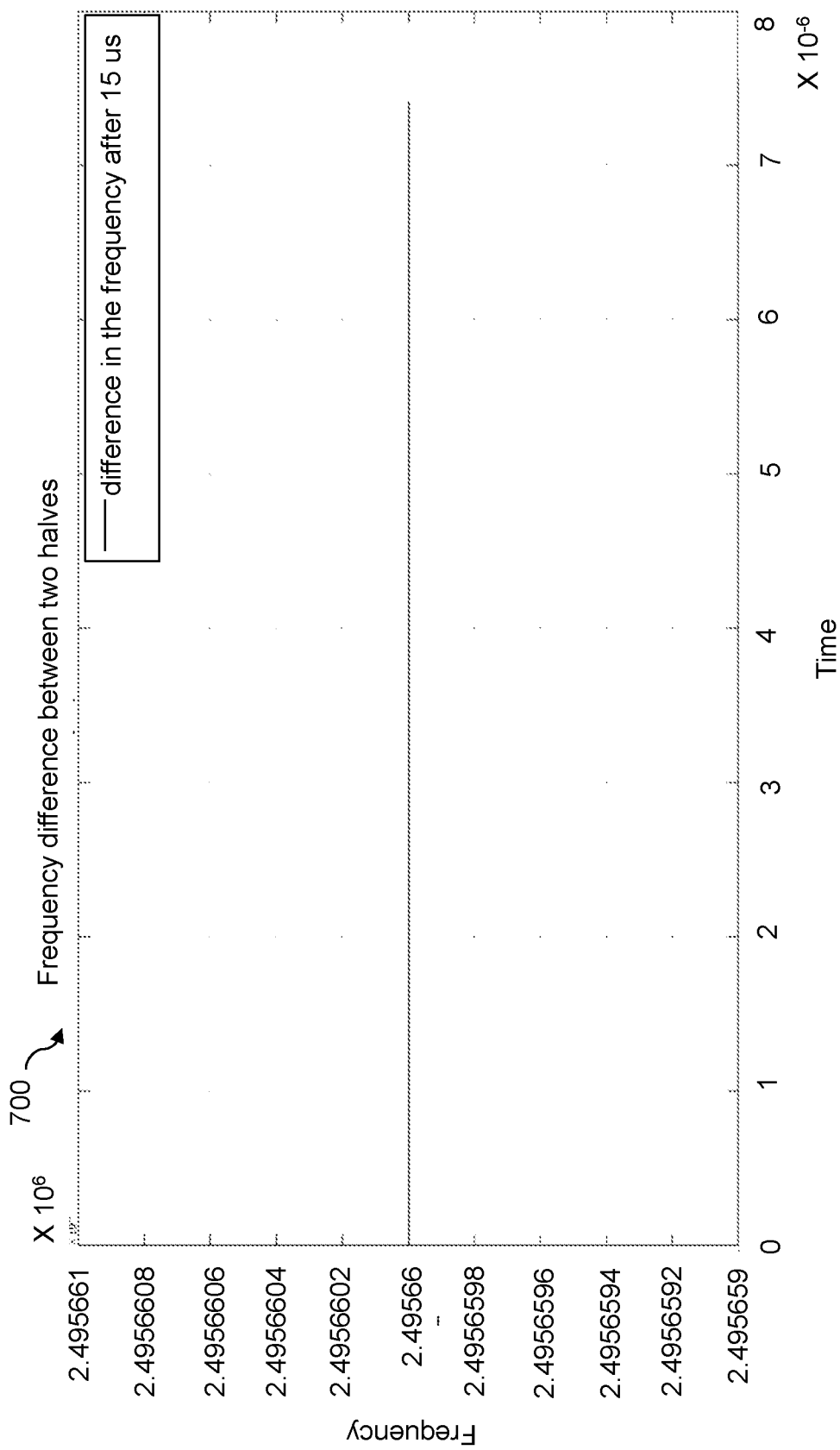
FIG. 7 illustrates an example graph of instantaneous frequency difference in a linear chirp, according to certain embodiments.

FIG. 7 illustrates an example graph 700 of instantaneous frequency difference in a linear chirp, according to certain embodiments. More specifically, FIG. 7 illustrates the instantaneous frequency difference between two halves of the linear chirp. As the frequency is linearly incremented, the frequency difference between any two-time instants differed by same time is constant. The frequency between two points differed by half of the chip duration is constant and is equal to half of the chirp width of 2.5 MHz.

Figure 8:
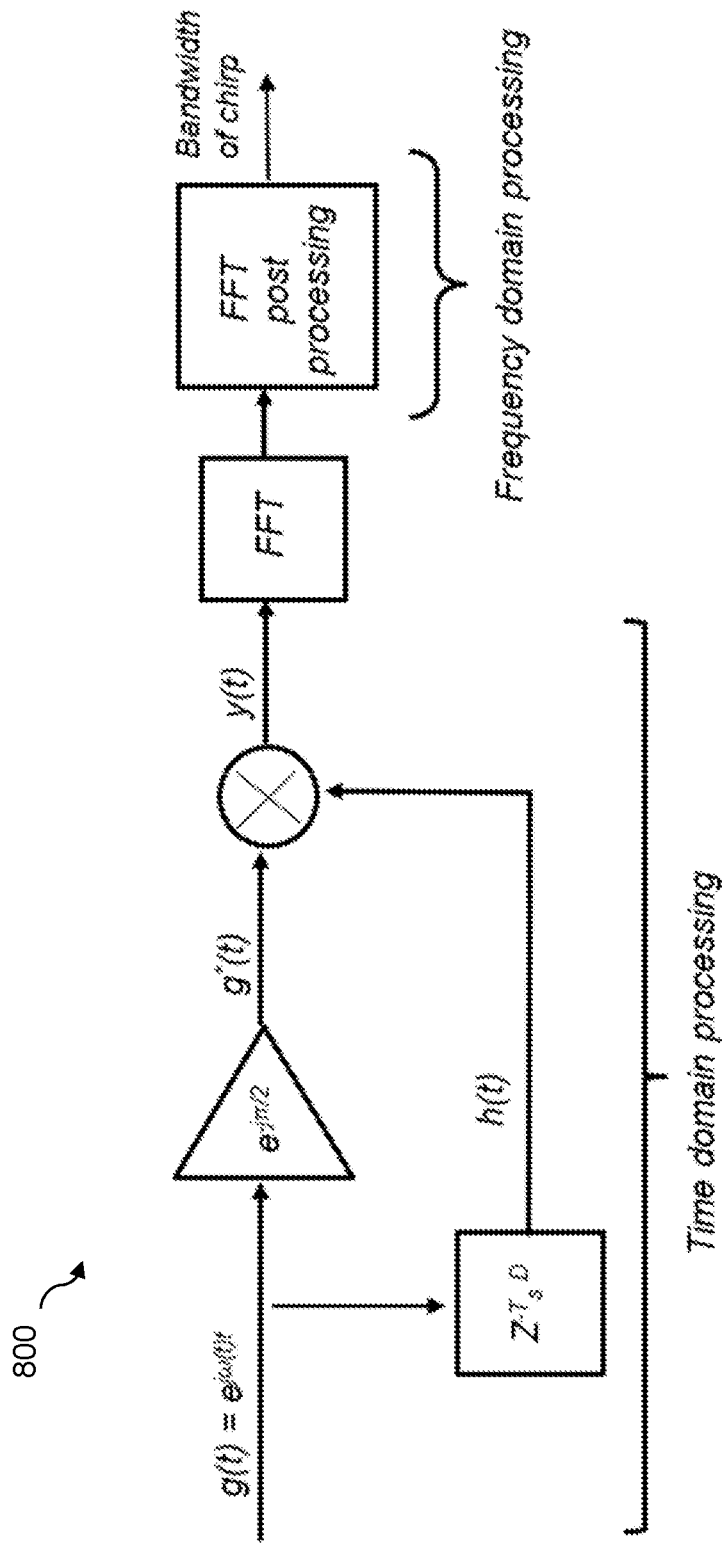
FIG. 8 illustrates an example mathematical view of linear chirp detection, according to certain embodiments.

FIG. 8 illustrates an example mathematical view 800 of linear chirp detection, according to certain embodiments. As seen in FIG. 8, an elementwise conjugate multiplication is performed between, D, segments of the chirped pulse samples of length, T. The result is passed through an FFT and the estimated chirp width is the derived from the outputted FFT spectrum.

By using the convolution theorem in Equation 5 below, it can be shown that the operation between h(t) and g*(t) in FIG. 8 corresponds to convolution in frequency domain:

$$H(\omega)*G\{-\omega\}=(h\cdot g^*)(t)$$

As shown in Equations 6 and 7 below, the right-hand side could be recognized as the operation made in FIG. 8 where:

$$h(t)=e^{j\omega(t-T_sD)(t-T_sD)}$$

$$g^*(t)=e^{j\omega(t)t}e^{-j\pi/2}$$

Where $T_s$ is the sample time/duration.

As shown in Equations 8 and 9 below, the corresponding Fourier transforms will be:

$H\{\omega\} = 2\pi\delta(\omega - \omega(t - T_s D))$ $G\{\omega\} = 2\pi\delta(\omega + \omega(t))$ Recall the definition of the chirp, $\omega(t)$ is rewritten in terms of $\omega(t - T_s D)$ in Equation 10:

$$\omega(t) = \omega(t - T_s D) + \frac{\omega_\beta T_s D}{T}$$

Inserted for $G\{g^*(t)\}$ in Equation 11:

$$\delta(\omega + \omega(t)) = \delta\left(\omega + \omega(t - T_s D) + \frac{\omega_\beta T_s D}{T}\right)$$

Convolution is defined in Equation 12 as $H\{\omega\} * G\{\omega\} = \int_{-\infty}^{\infty} H(\tau) G(\omega - \tau) d\tau$ Replace $H(\tau)$ and $G(\omega-\tau)$ in Equation 12 by using Equation 8 and Equation 11 the convolution between the dirac functions equal Equation 13:

$$H\{\omega\} * G\{\omega\} = 4\pi^2 \int_{-\infty}^{\infty} \delta(\tau - \omega(t - T_s D)) \delta\left(\omega - \tau + \omega(t - T_s D) + \frac{\omega_\beta T_s D}{\tau}\right) d\tau$$

It may be seen that $H(\tau) \neq 0$ only for $\tau = \omega(t - T_s D)$. As shown in Equation 14, solving corresponding $\omega$ using $\tau = \omega(t - T_s D)$ for $G(\omega - \tau)) \neq 0$:

$$\omega - \tau + \omega(t - T_s D) + \frac{\omega_\beta T_s D}{T} = \omega + \frac{\omega_\beta T_s D}{T} = 0 \xrightarrow{yields} \omega = -\frac{\omega_\beta T_s D}{T}$$

The relation in Equation 14 will hold for any $t \in \{T_s D, \ldots, T\}$ where $t_0$ is the start time for the chirp. The continuous input signal to the FFT block in FIG. 8 may then be written in Equation 15 as:

$$y(t) = e^{-j\frac{\omega_\beta T_s D}{T} t}$$

where $t \in \{T_s D, \ldots T\}$.

The time domain function is then passed through a FFT in Equation 16:

$$Y(\omega) =$$
$$FFT\{w(t) \cdot y(t)\} = FFT\left\{w(t) \cdot e^{-j\frac{\omega_\beta T_s D}{T} t}\right\} = W(\omega) * 2\pi\delta\left(\omega + \frac{\omega_\beta T_s D}{T}\right)$$

where w is the window function used on the received chirp signal.

Assuming $w(t)$ is rectangular its frequency spectrum $W(\omega)$ will be given by a sinc function. The output from the FFT will thus be a sinc located at $$f_\beta = -\frac{\omega_\beta T_s D}{2\pi T}$$

with $1^{st}$ crossing of the frequency axis at $f = 1/T_s D$. The model in Equation 16 could be used to derive wanted detection performance for arbitrary amplitude, A, and length, T, with selected window function, W, as a design choice in Equation 17:

$$P_{detection} = f(A, W, T)$$

where A is the amplitude of y that for simplicity has been set to one in the conceptual outline.

As described above, FIG. 8 illustrates the discrete time domain. In a particular embodiment, the bandwidth of the chirp after time domain processing was shown by Equation 15 to be reduced by D. The sample rate in the algorithm can thus be decimated by D. As such, the parameter D facilitates the calculation complexity in the algorithm to be tuned based on the available DSP resources for the selected hardware platform, according to certain embodiments. In a particular embodiment, a decimation factor of two may be used.

Figure 9:
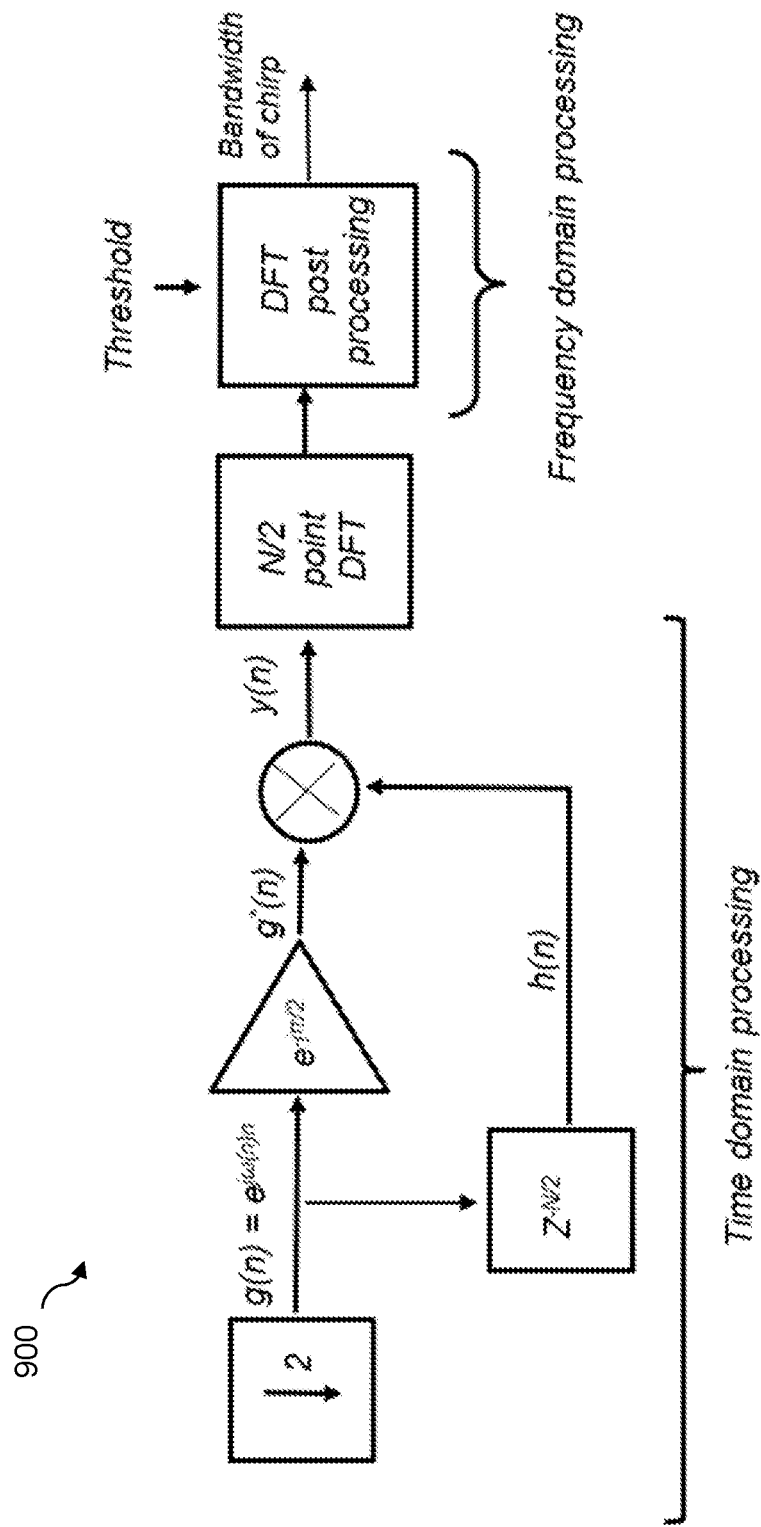
FIG. 9 illustrates an example conceptual view of chirp detection in discrete time, according to certain embodiments.

FIG. 9 illustrates an example conceptual view 900 of chirp detection in discrete time, according to certain embodiments.

Figure 10:
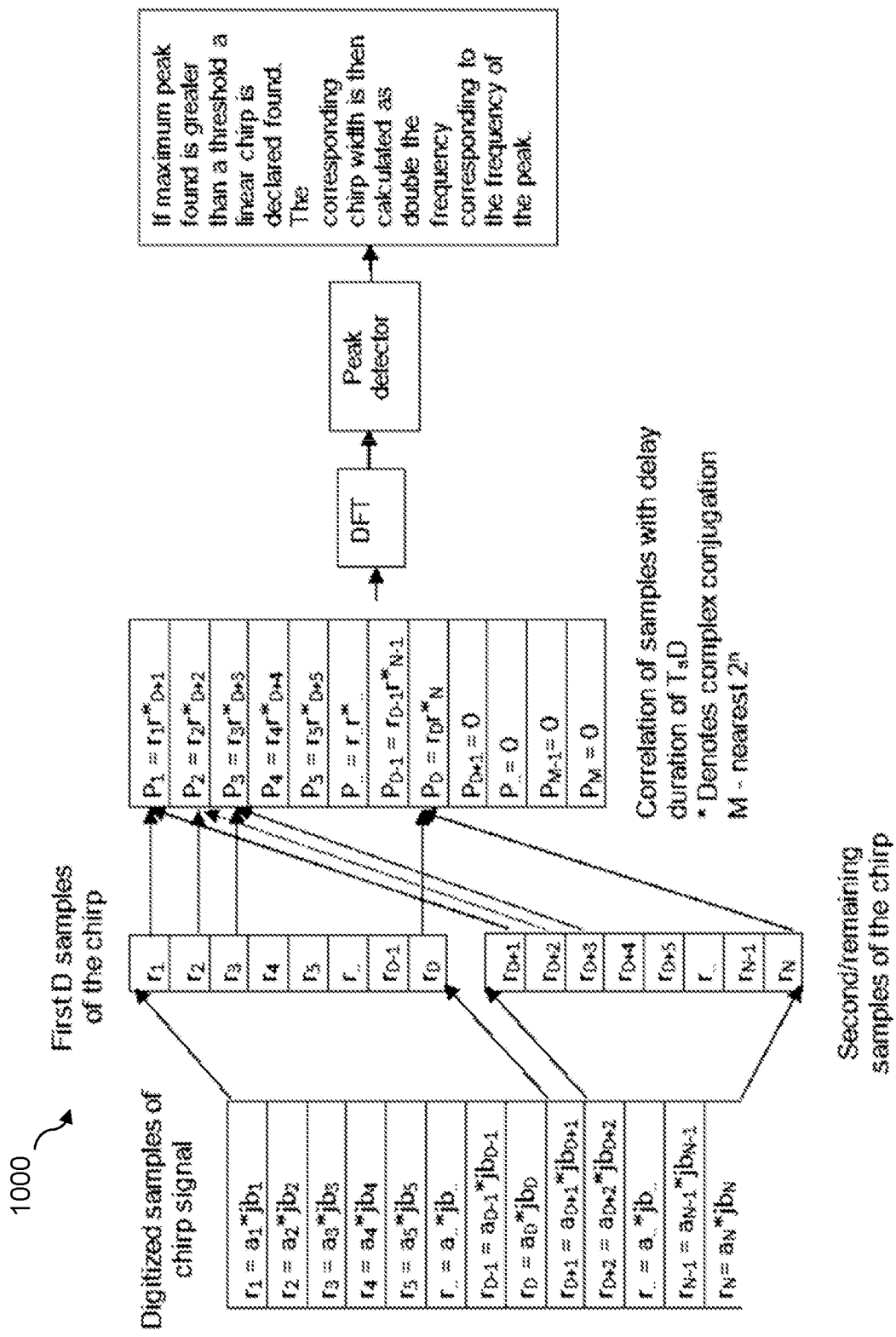
FIG. 10 illustrates an example conceptual view of chirp detection in discrete time, according to certain embodiments.

FIG. 10 illustrates an example of complex multiplication 1000 in time domain, according to certain embodiments. Specifically, the digitized complex or real data is stored in the buffer for the linear chirp detection procedure. Consider there are N samples in the linear chirp. The buffer may contain full or part of the linear chirp radar pulse.

As shown in FIG. 10, the linear chip data buffer may be divided into at least two groups of samples. For example, a first group may include a first number of D samples of the linear chirp and the second group may include the remaining N−D samples of the linear chirp. Correlation between the at least two groups of samples is performed by doing the complex multiplication of the samples. For example, elementwise complex multiplication of the D samples in the first group of samples may be performed with the conjugate of N−D samples in the second group of samples. The resultant group of samples is a number of M samples, which are stored in another buffer. The resultant is the change in the phase between the at least two groups of samples after (D/sample rate) duration.

In a particular embodiment, the length of buffer is equal to M and M is equal to D or nearest two powers. If M is greater than D, the (M−D) values are suffixed with zeros, as shown in FIG. 10. In a particular embodiment, if the two more groups of samples have different durations, the shortest duration may be used to determine the number of samples to suffix.

In a particular embodiment, FFT is performed on the correlated data to find the frequency properties. Peak search may then be performed on the FFT output. Peak value to the noise floor ratio is calculated and this value is compared against the threshold to avoid the false alarms. If the peak to noise floor is greater than the threshold, declare as linear chirp found and chirp width as double the frequency corresponding to the peak.

According to certain embodiments, the method is tunable for different sample rates and different FFT sizes. If the load on the processor is critical, then the proposed algorithm may be run with reduced sample rate by selecting one sample for every D samples from the digitized sample buffer. In a particular embodiment, the length of FFT may also be configurable. For example, in a particular embodiment, the length of FFT may be inversely proportional to the accuracy of the chirp width detected.

Figure 11:
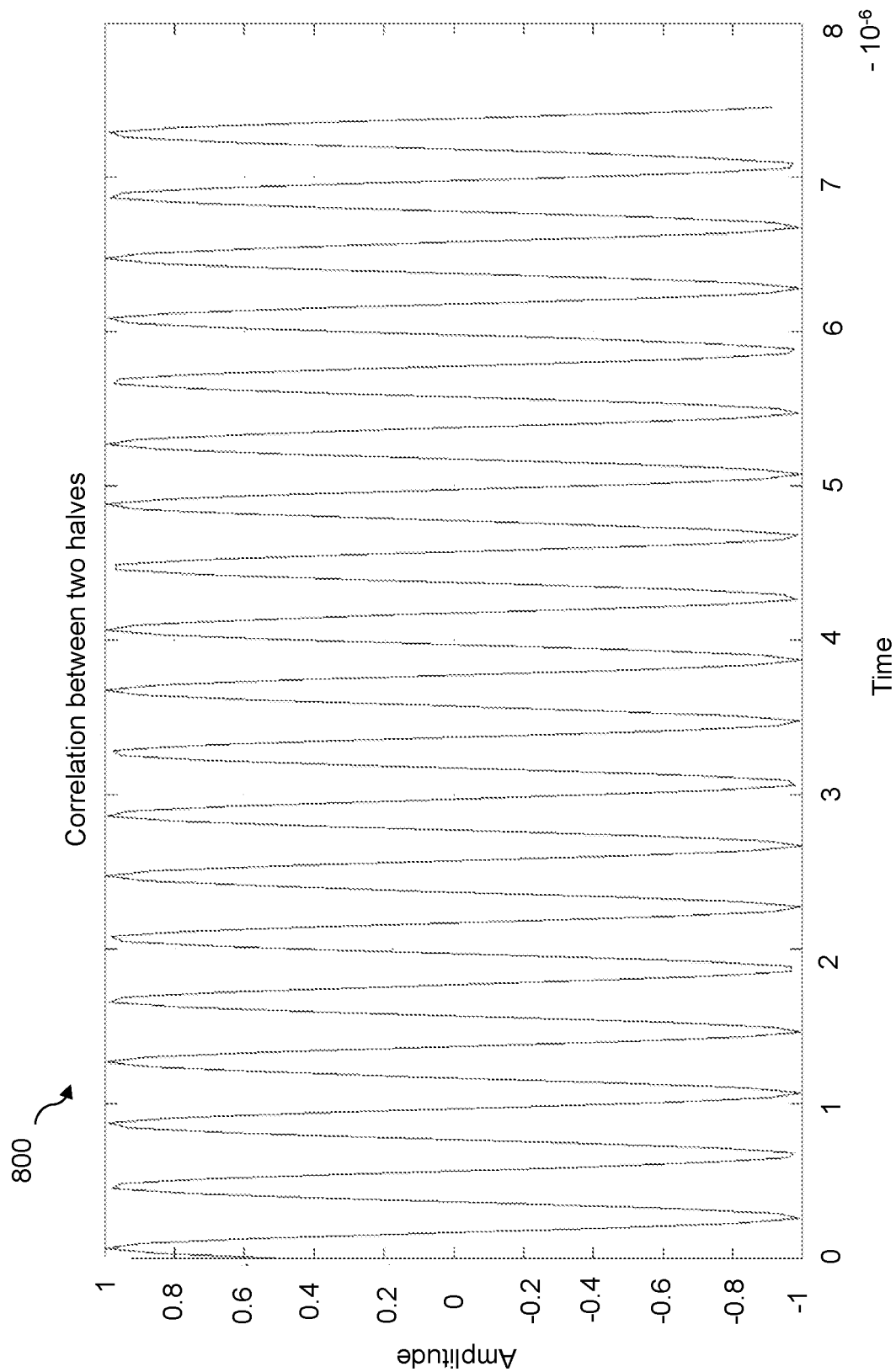
FIG. 11 illustrates an example graph of time domain correlation between two halves of a linear chirp, according to certain embodiments

FIG. 11 illustrates an example graph 1100 of time domain correlation between two halves of a linear chirp, according to certain embodiments.

Figure 12:
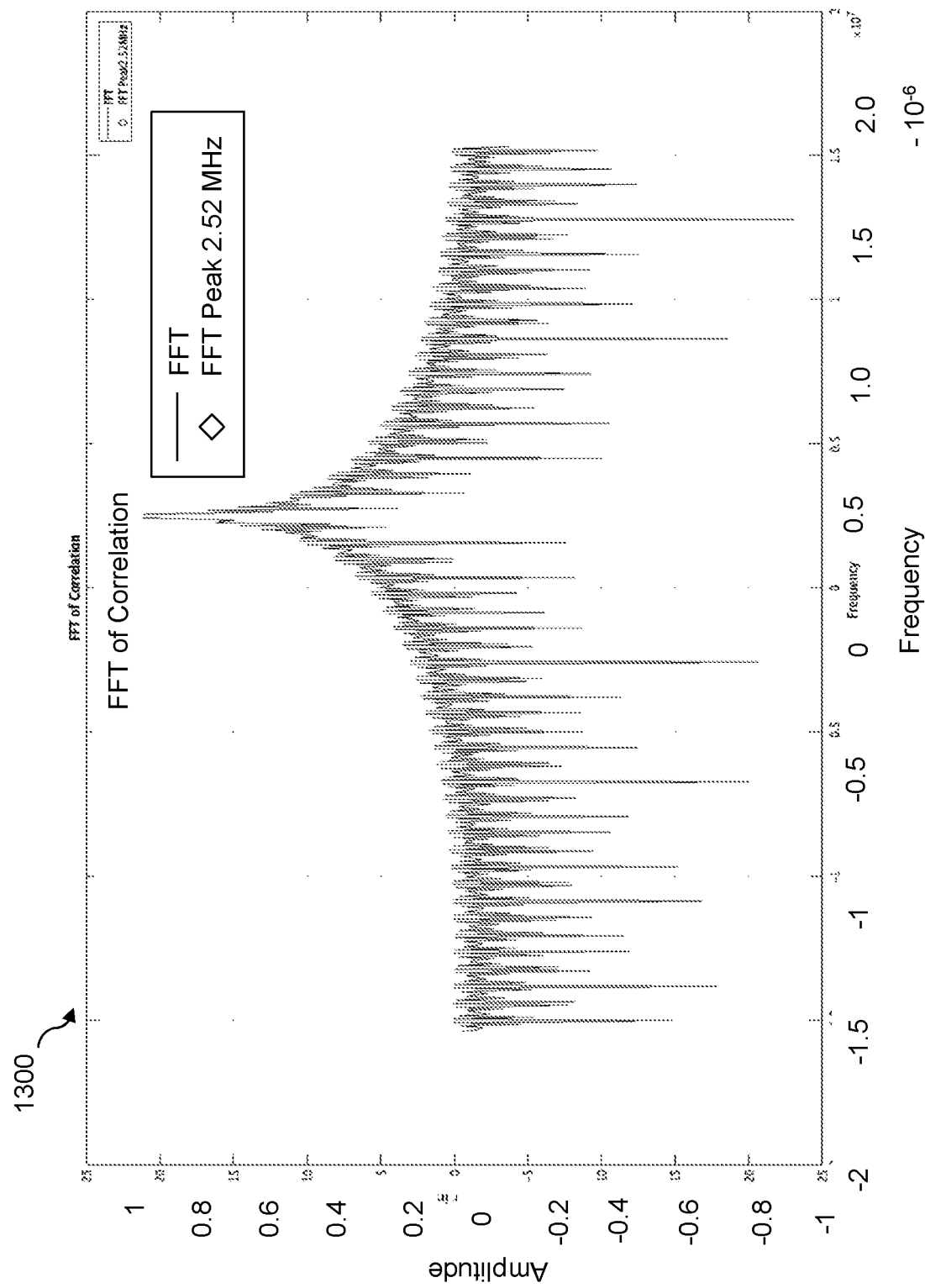
FIG. 12 illustrates an example frequency domain plot of correlation between two halves of a linear chirp, according to certain embodiments.

In case of sinusoidal signal, the value of β is zero and its constant phase difference is Φ. The frequency of the sinusoidal signal $$\left(\frac{f_1 - f_c}{2}\right)$$

can be detected using DFT. If required ρ will suffixed with zeros before FFT. The FFT of the ρ(m) is given in FIG. 12, which illustrates an example frequency domain plot 1200 of correlation between two halves of a linear chirp, according to certain embodiments. The frequency of the sinusoidal signal is estimated by find the peak power and its respective frequency. In FIG. 12, the frequency component of the maximum power is 2.52 MHz. The accuracy of the frequency is dependent on the number of FFT points used. The detected frequency 2.52 MHz is approximately equal to the frequency difference (2.496 MHz) observed between two halves in FIG. 12. The false alarms can be avoided by giving the threshold for difference between peak power to the noise floor.

As stated in Equation 16 and illustrated in FIG. 12, the presence of a chirp may be a clear peak at half the chirp width in the DFT spectrum. The detection criteria in the DFT post processing is based on the SINR of the spectrum peak $$\text{Chirp detected} = \begin{cases} 1 & \text{if } \frac{|Y(f_{peak_i})|^2}{\text{mean}(|Y(f_{noise_i})|^2)} Th \\ 0 & \text{else} \end{cases} \quad 1)$$

where $f_{peaki}$ is the indices to the peak in the spectrum and $f_{noisei}$ is the indices to every other sample than the peak indices in the spectrum, Th is a constant design value.

Figure 13:
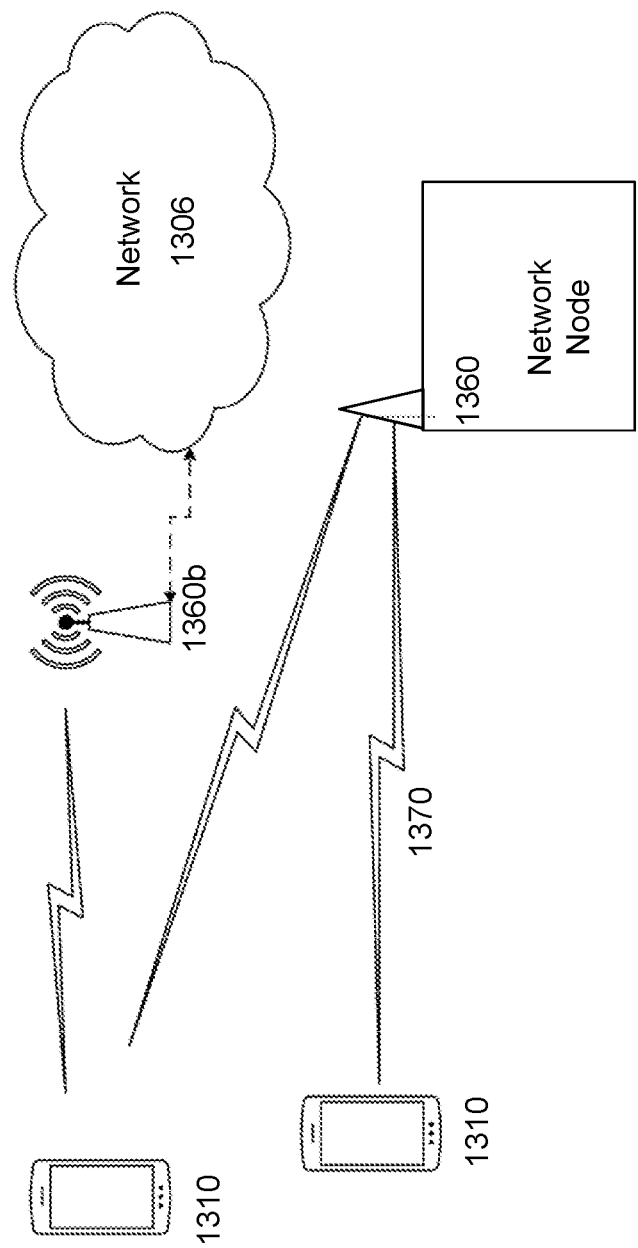
FIG. 13 illustrates an exemplary network for linear chirp detection, in accordance with certain embodiments.

FIG. 13 is a block diagram a wireless network 1300 for linear chirp detection, in accordance with certain embodiments. Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360b, and WDs 1310, 1310b, and 1310c. In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 14:
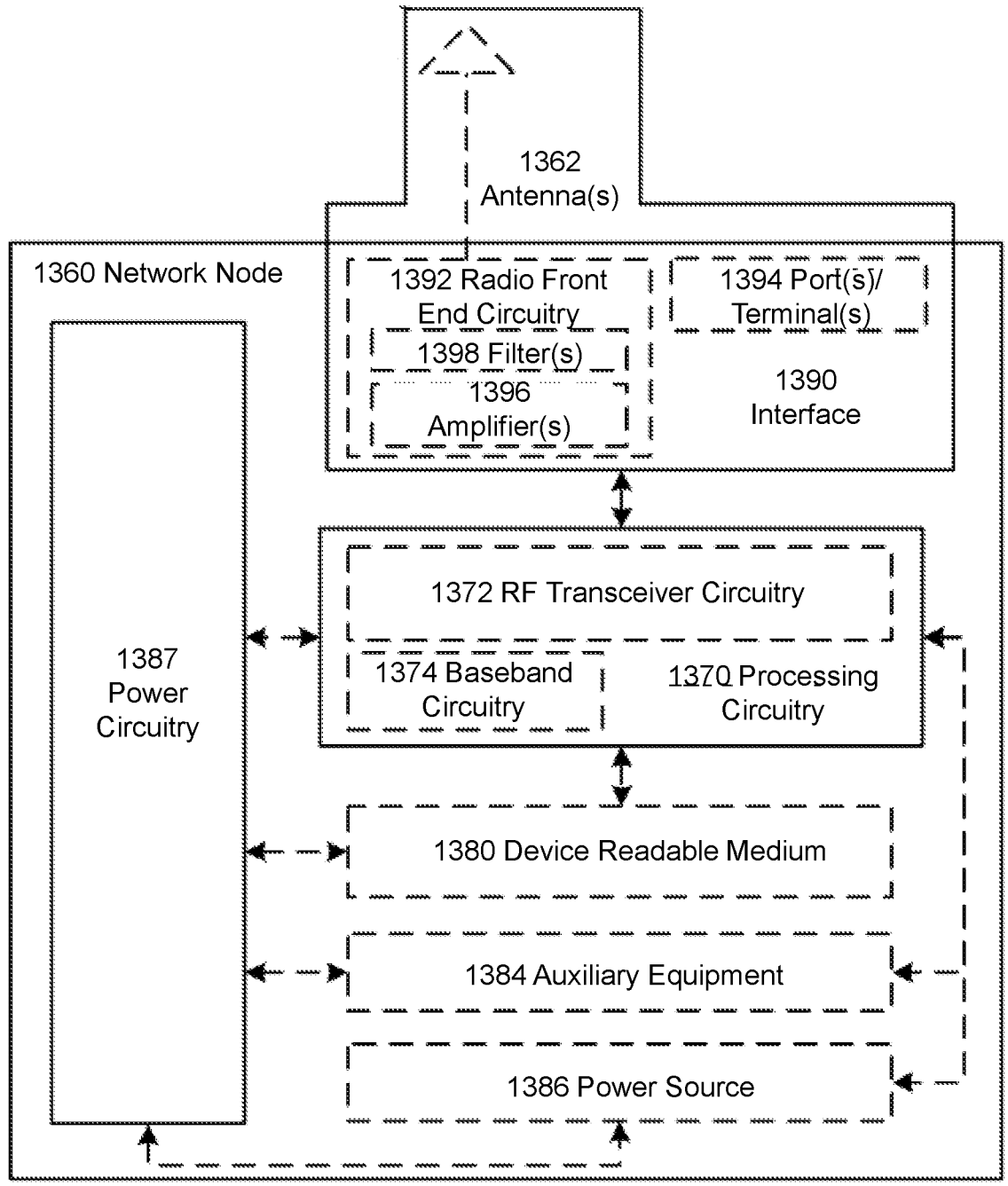
FIG. 14 illustrate an example network node for linear chirp detection, according to certain embodiments.

FIG. 14 illustrates an example network node 1360 for linear chirp detection, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units.

In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360 but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

Figure 15:
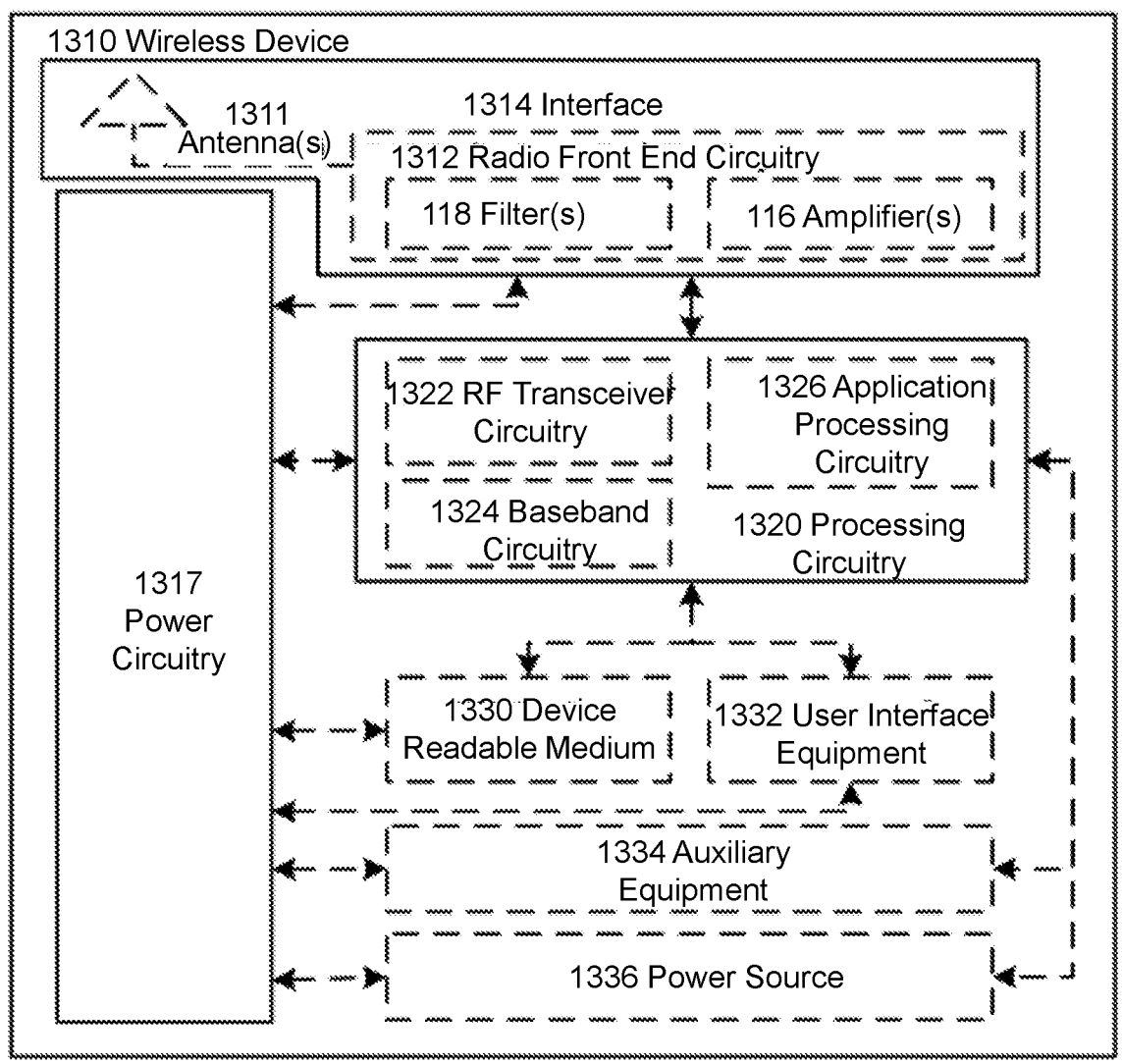
FIG. 15 illustrates an example wireless device for linear chirp detection, according to certain embodiments.

FIG. 15 illustrates an example wireless device (WD) for linear chirp detection, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320 and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310 and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 16:
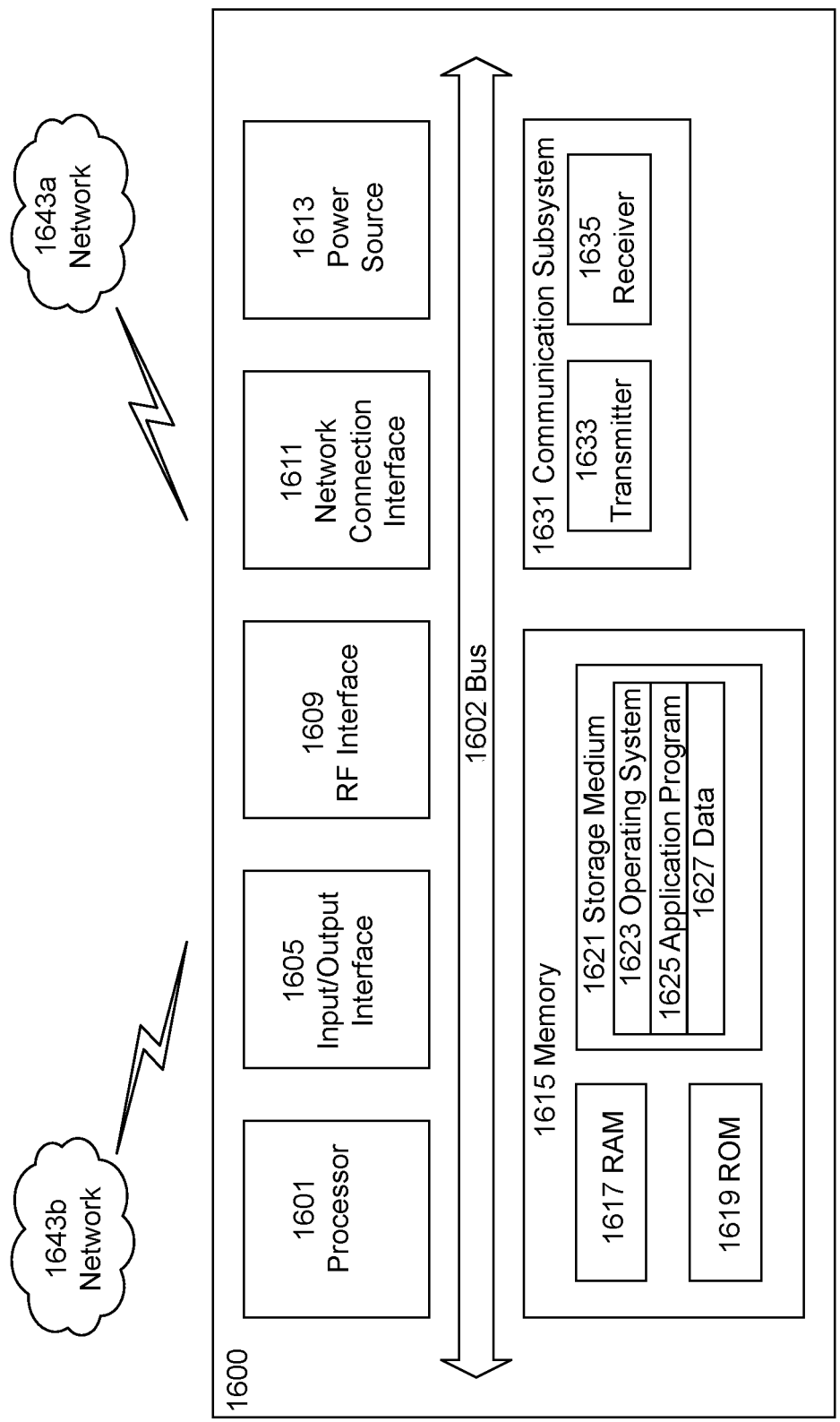
FIG. 16 illustrates an example user equipment, according to certain embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 16200 may be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1405. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a local-area network (LAN), a wide-area network (WAN), a computer network, a wireless network, a telecommunications network, another like network or any combination thereof. For example, network 1643a may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643b using communication subsystem 1631. Network 1643a and network 1643b may be the same network or networks or different network or networks. Communication subsystem 1631 may be configured to include one or more transceivers used to communicate with network 1643b. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643b may encompass wired and/or wireless networks such as a local-area network (LAN), a wide-area network (WAN), a computer network, a wireless network, a telecommunications network, another like network or any combination thereof. For example, network 1643b may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
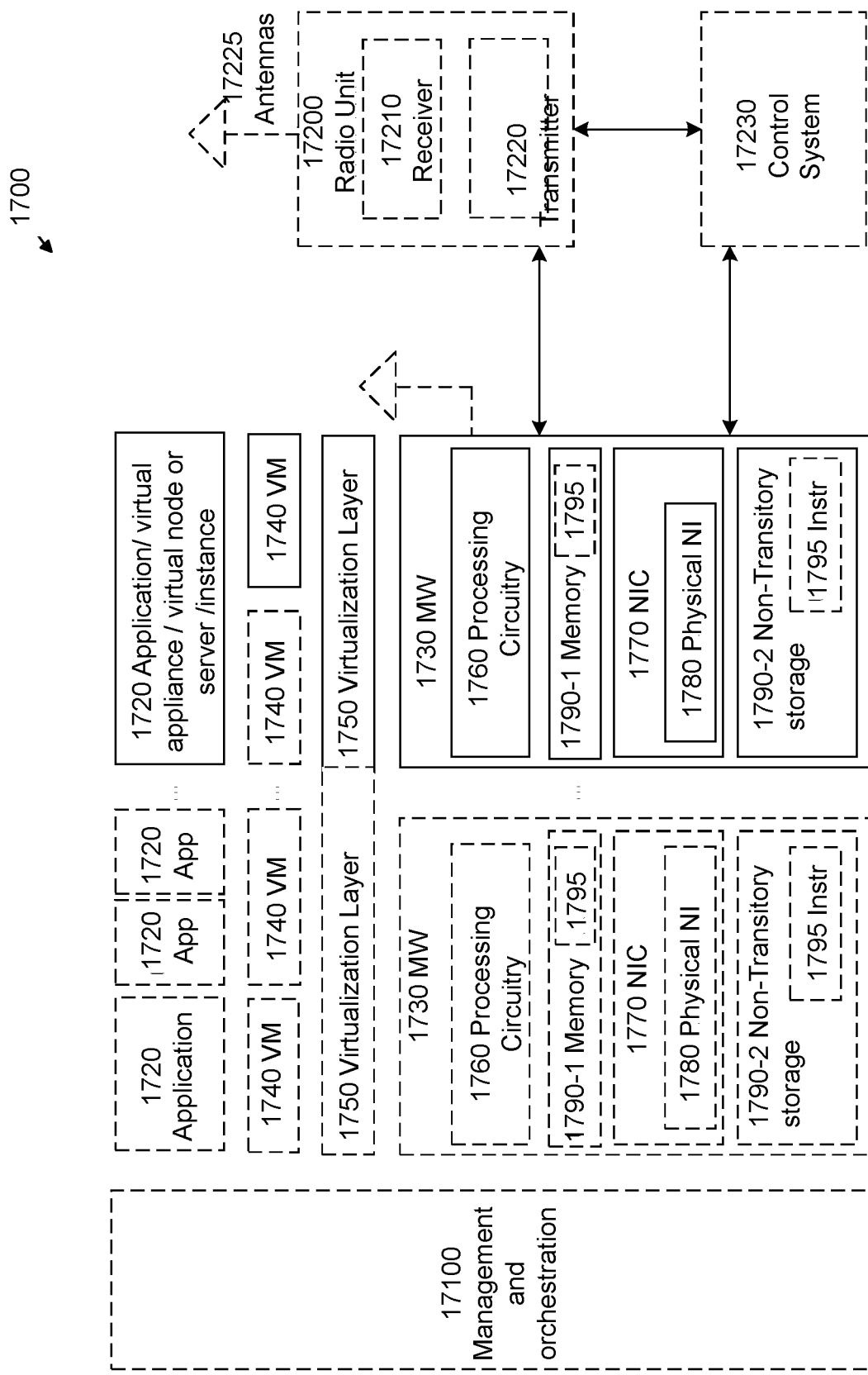
FIG. 17 illustrates an example virtualization environment, according to certain embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signaling can be affected with the use of control system 17230 which may alternatively be used for communication between the hardware nodes 1730 and radio units 17200.

Figure 18:
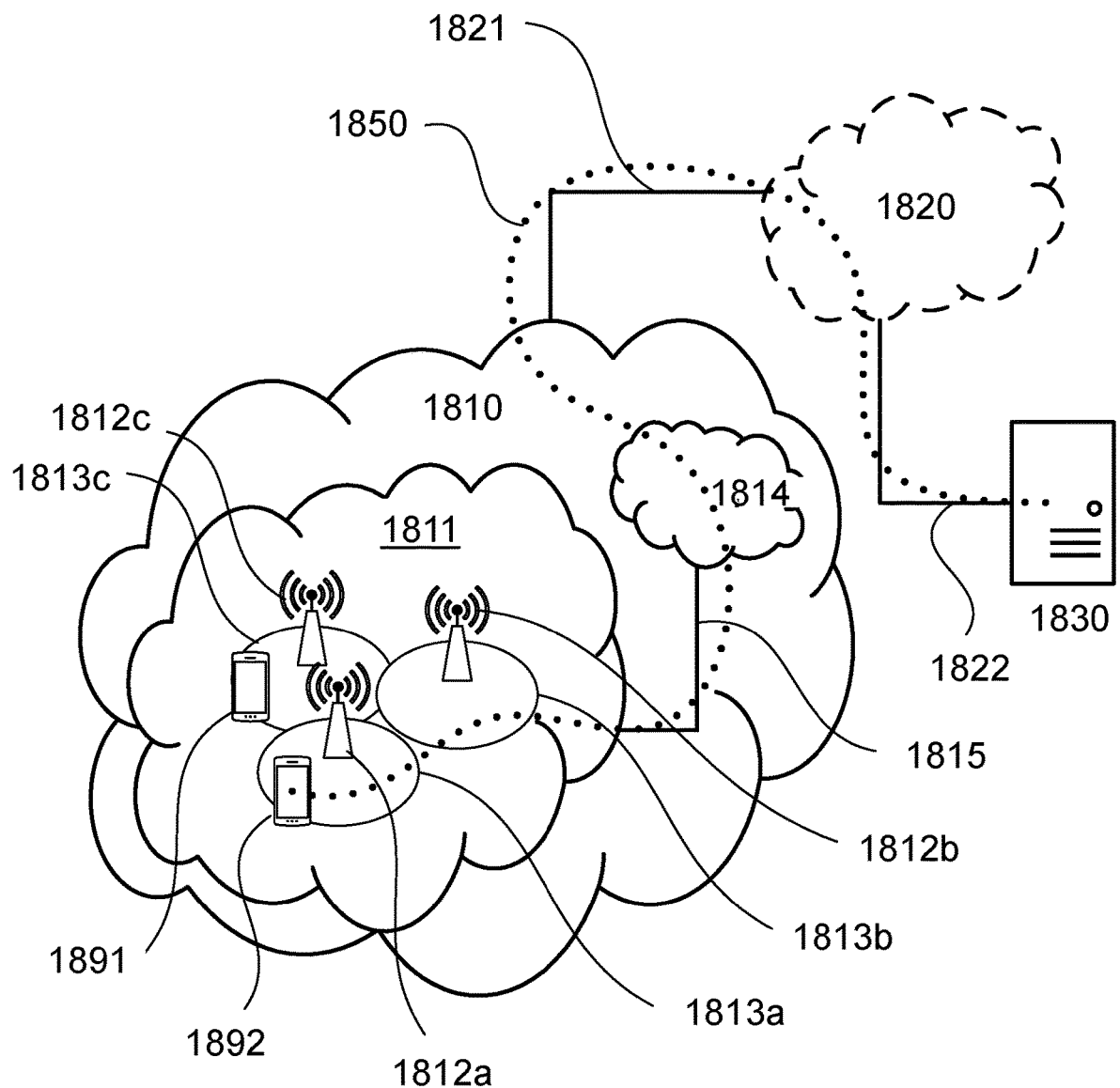
FIG. 18 illustrates a telecommunication network connected via an intermediate network to a host computer, according to certain embodiments.

FIG. 18 illustrates a telecommunication network connected via an intermediate network to a host computer in accordance with some embodiments. With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 19:
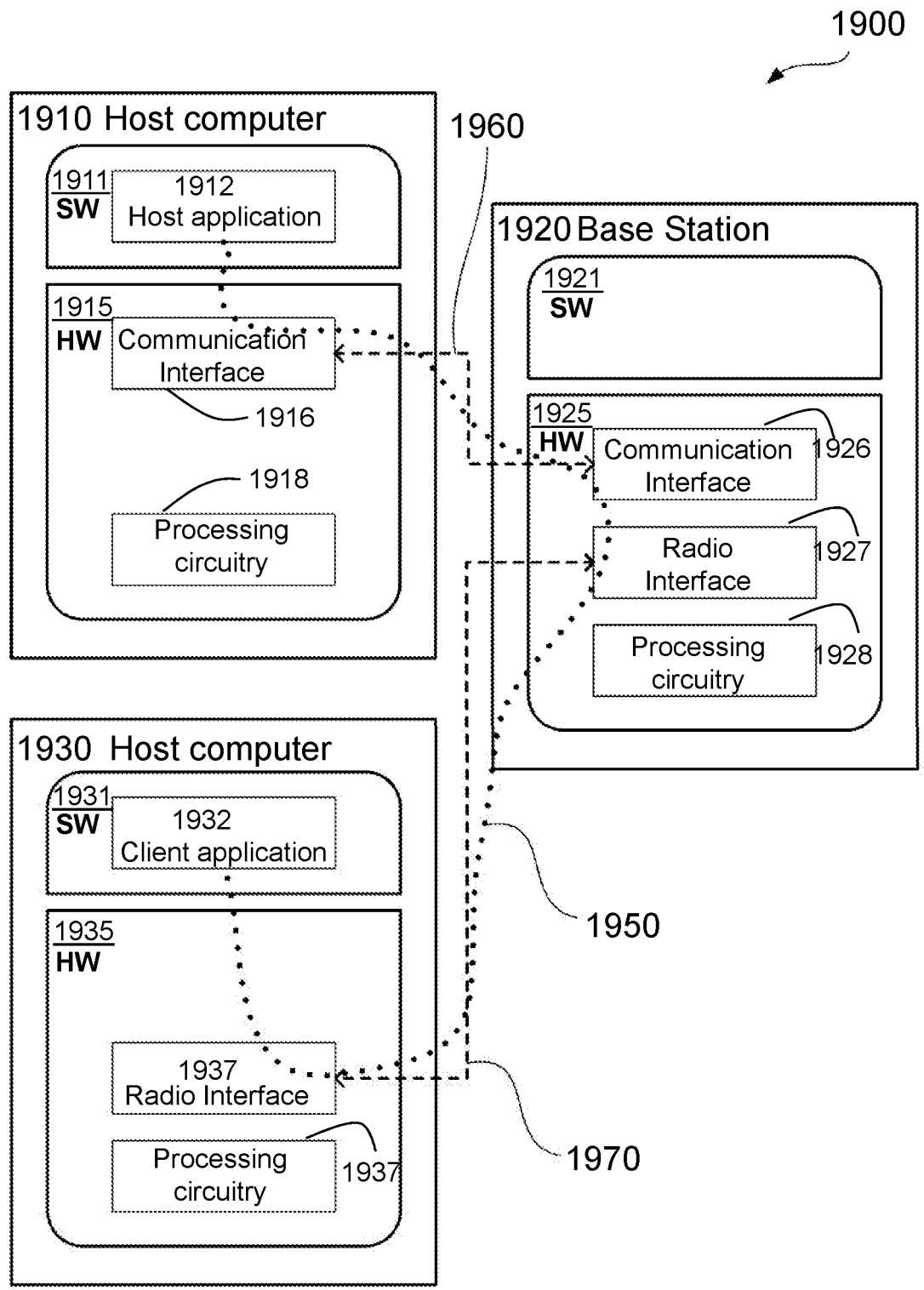
FIG. 19 illustrates a generalized block diagram of a host computer communicating via a base station with a user equipment over a partially wireless connection, according to certain embodiments.

FIG. 19 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 19 may be similar or identical to host computer 1830, one of base stations 1812a, 1812b, 1812c and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime. A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figures 20, 21:
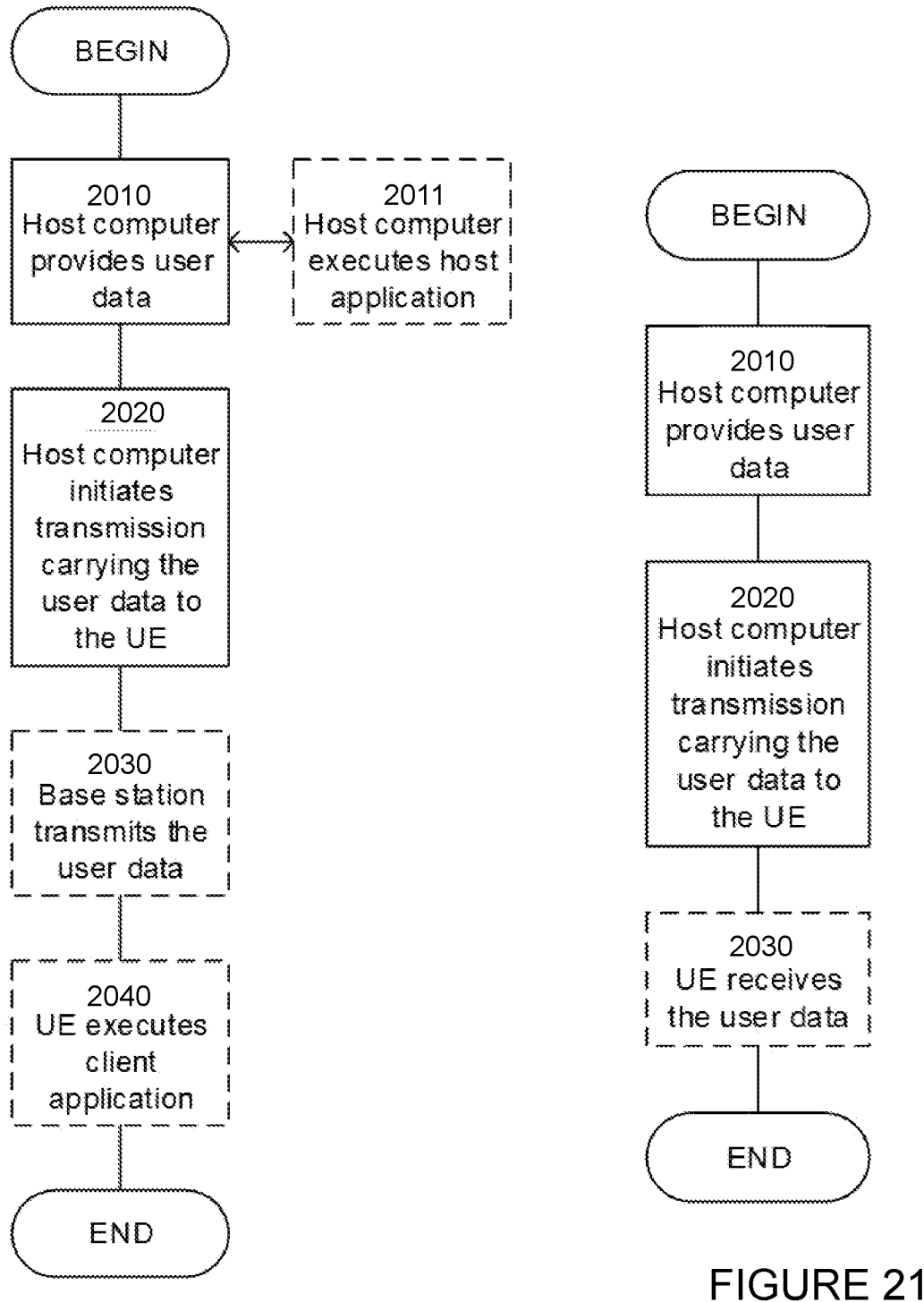
FIG. 20 illustrates a method implemented in a communication system, according to one embodiment.
FIG. 21 illustrates another method implemented in a communication system, according to one embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figures 22, 23:
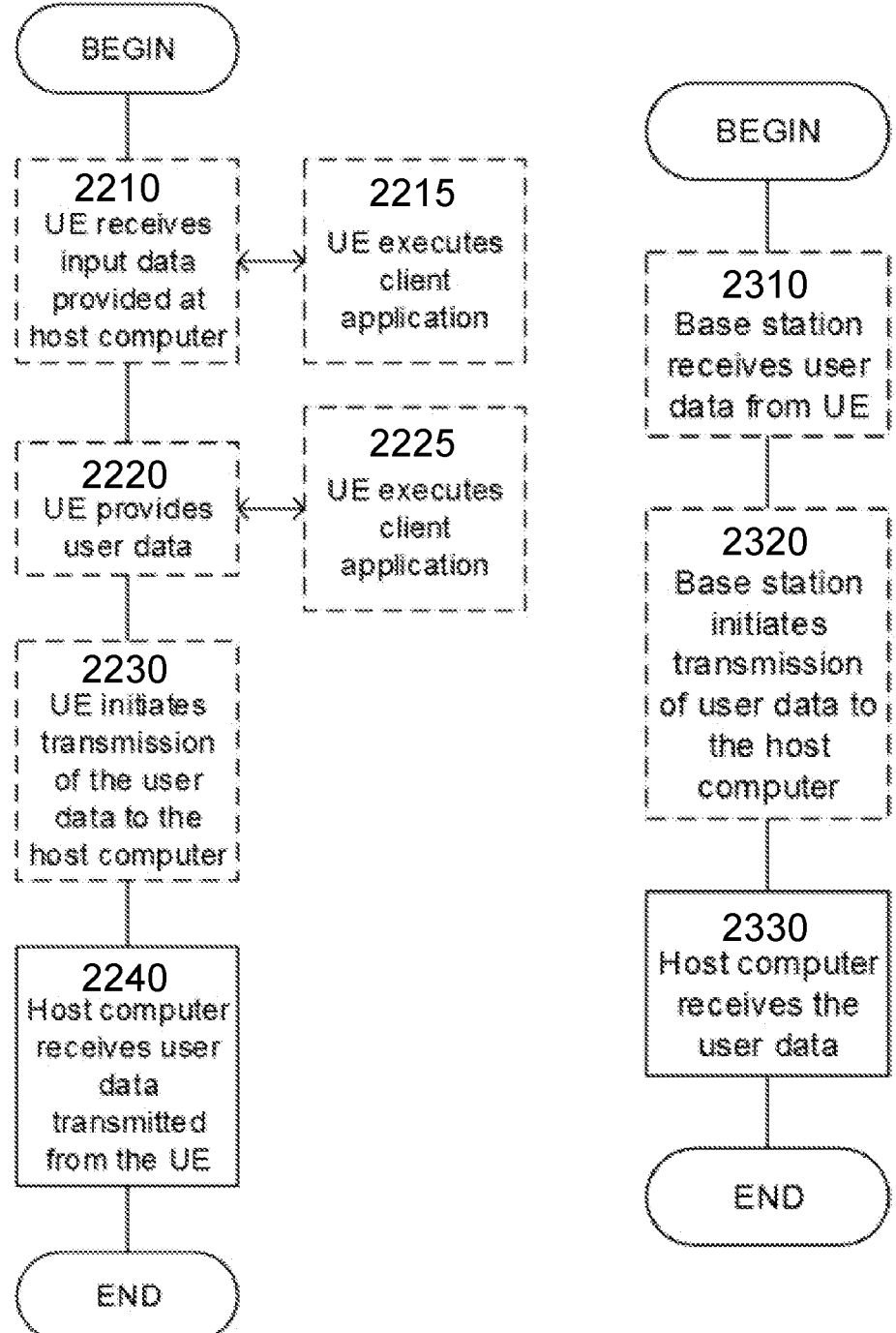
FIG. 22 illustrates another method implemented in a communication system, according to one embodiment.
FIG. 23 illustrates another method implemented in a communication system, according to one embodiment.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Figure 24:
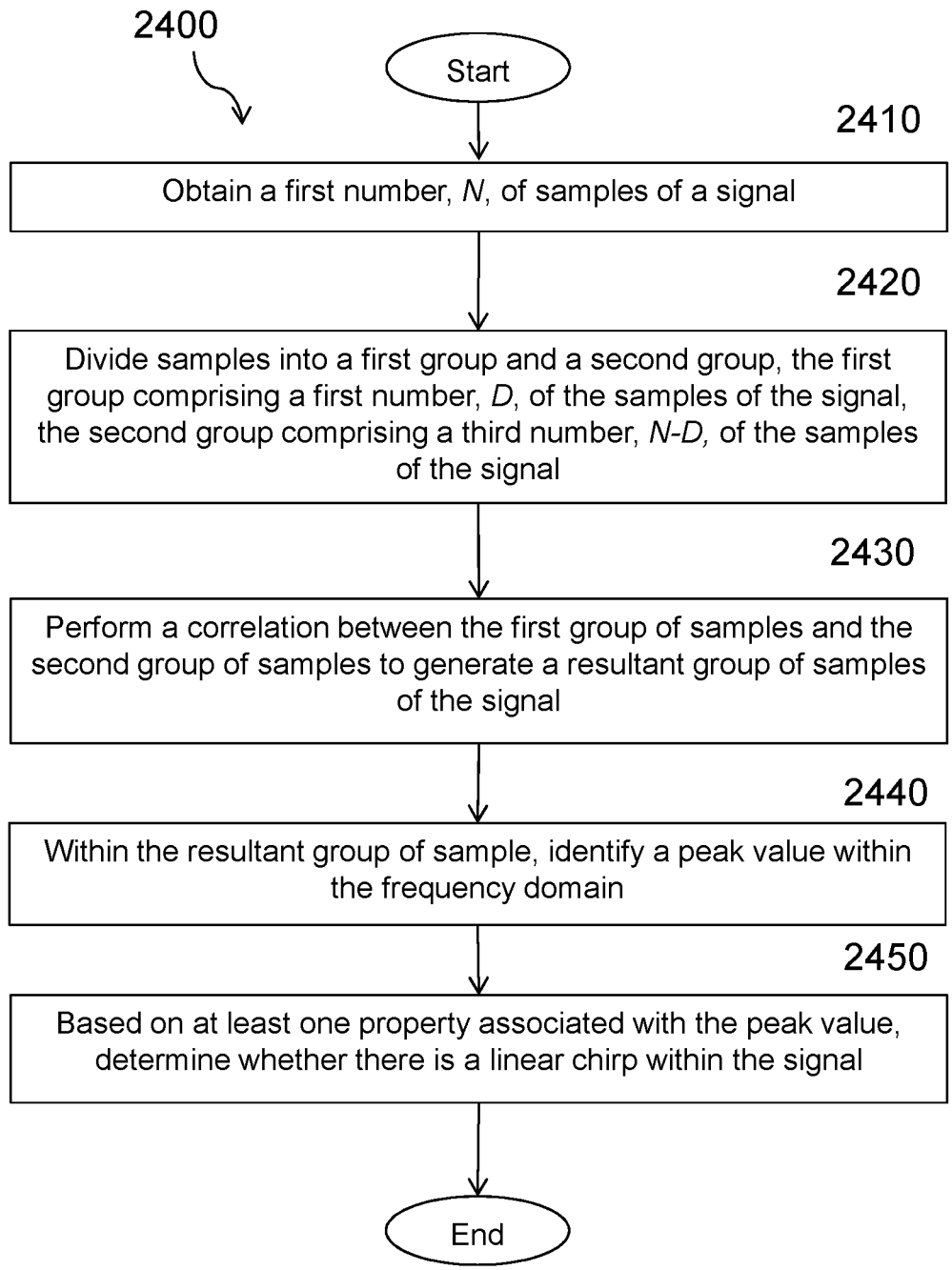
FIG. 24 illustrates an example method by a network node for linear chirp detection, according to certain embodiments.

FIG. 24 depicts a method 2400 by a network node 1360 for linear chirp detection, according to certain embodiments. The method begins at step 2410 when network node 1360 obtains a first number, N, of samples of a signal. In a particular embodiment, for example, network node 1360 may repeatedly detect energy for a sample duration, which is followed by a silent period where the energy is not detected. In another particular embodiment, network node 1360 may select the first number, N, of the samples from a larger group of N×Z samples, wherein while selecting the first number, N, of the samples, every z-th sample is selected.

At step 2420, network node 1360 divides the samples into at least a first group of samples and a second group of samples. The first group of samples includes a second number, D, of the samples of the signal, and the second group comprises a third number, N−D, of the samples of the signal.

At step 2430, network node 1360 performs a correlation between the first group of samples and the second group of samples to generate a resultant group of samples of the signal. In a particular embodiment, the resultant group of samples may represent a change of phase between the first group of samples and the second group of samples after a duration. In a further particular embodiment, the duration is D divided by a sample rate.

In a particular embodiment, performing the correlation between the first group of samples and the second group of samples may include multiplying the second number, D, of the samples with a conjugate of the third number, N−D, of the samples.

In a further particular embodiment, performing the correlation between the first group of samples and the second group of samples may include performing elementwise complex multiplication of second number, D, of the samples with the third number, N−D, of the samples to generate the resultant group of samples. In a particular embodiment, the number of samples in the resultant group is M and M is equal to D. In another embodiment, the method may further include padding the resultant group of samples to a nearest two power such that the number of samples in the resultant group is M and M is greater than or equal to D.

At step 2440, network node 1360 identifies, within the resultant group of samples, a peak value in the frequency domain.

Based on at least one property associated with the peak value, network node 1360 determines whether there is a linear chirp within the signal, at step 2450.

In a particular embodiment, for example, the determination of whether there is a linear chirp within the signal may include comparing the peak value to a threshold. If the peak value is greater than or equal to the threshold, network node 1360 may determine that there is a linear chirp within the signal. Conversely, if the peak value is not greater than or equal to the threshold, network node 1360 may determine that there is not the linear chirp within the signal.

In another particular embodiment, the determination of whether there is a linear chirp within the signal may include calculating a peak value-to-noise floor ratio and comparing the peak value to noise floor ratio to the threshold. If the peak value-to-noise-floor ratio is greater than or equal to the threshold, network node 1360 may determine that there is a linear chirp within the signal. Conversely, if the peak value-to-noise floor ratio is not greater than or equal to the threshold, network node 1360 may determine that there is not a linear chirp within the signal.

In a particular embodiment, the at least one peak value includes a value of the peak, an absolute value, or a signal-to-noise ratio (SNR).

In a particular embodiment, the method may further include performing DFT or FFT on the resultant group of samples to find the peak value.

In a particular embodiment, network node 1360 may determine that there is the linear chirp within the signal and a width of the linear chirp may be double the frequency corresponding to the peak value.

In a particular embodiment, network node 1360 may determine that the linear chirp is associated with a radar signal and the network node 1360 may abstain from transmitting on a channel associated with the radar signal for a radar duration. Conversely, in another embodiment, network node 1360 may determine that there is not a linear chirp within the signal. In response to determining that there is not the linear chirp within the signal, network node 1360 may transmit on a channel associated with the signal.

Figure 25:
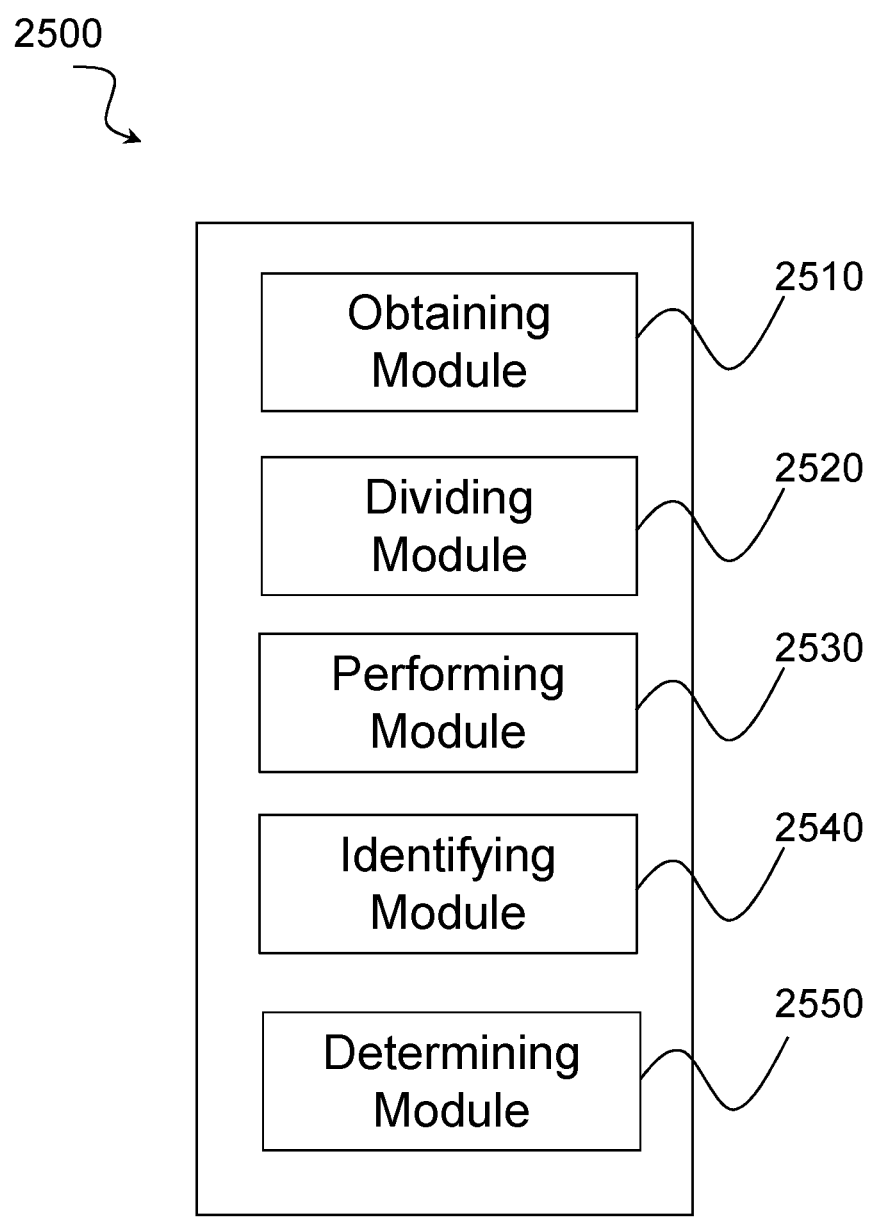
FIG. 25 illustrates an example virtual computing device for linear chirp detection, according to certain embodiments.

FIG. 25 illustrates a schematic block diagram of a virtual apparatus 2500 in a wireless network (for example, the wireless network shown in FIG. 13). The apparatus may be implemented in a wireless device or network node (e.g., wireless device 1310 or network node 1360 shown in FIG. 13). Apparatus 2500 is operable to carry out the example method described with reference to FIG. 24 and possibly any other processes or methods disclosed herein. It is also to be understood that the method of FIG. 24 is not necessarily carried out solely by apparatus 2500. At least some operations of the method can be performed by one or more other entities.

Virtual Apparatus 2500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 2510, dividing module 2520, performing module 2530, identifying module 2540, determining module 2550, and any other suitable units of apparatus 2500 to perform corresponding functions according one or more embodiments of the present disclosure.

According to certain embodiments, obtaining module 2510 may perform certain of the obtaining functions of the apparatus 2500. For example, obtaining module 2510 may obtain a first number, N, of samples of a signal.

According to certain embodiments, dividing module 2520 may perform certain of the dividing functions of the apparatus 2500. For example, dividing module 2520 may divide the samples into at least a first group of samples and a second group of samples.

According to certain embodiments, performing module 2530 may perform certain of the performing functions of the apparatus 2500. For example, performing module 2530 may perform a correlation between the first group of samples and the second group of samples to generate a resultant group of samples of the signal.

According to certain embodiments, identifying module 2540 may perform certain of the identifying functions of the apparatus 2500. For example, identifying module 2540 may identify, within the resultant group of sample, a peak value in the frequency domain.

According to certain embodiments, determining module 2550 may perform certain of the determining functions of the apparatus 2500. For example, determining module 2550 may determine whether there is a linear chirp within the signal based on at least one property associated with the peak value.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated.

Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s):

| | |
|---|---|
| 1x RTT | CDMA2000 1x Radio Transmission Technology |
| 3GPP | 3rd Generation Partnership Project |
| 5G | 5th Generation |
| 5GS | 5G System |
| 5QI | 5G QoS Identifier |
| ABS | Almost Blank Subframe |
| AN | Access Network |
| AN | Access Node |
| ARQ | Automatic Repeat Request |
| AS | Access Stratum |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CN | Core Network |
| CP | Cyclic Prefix |
| CPICH | Common Pilot Channel |
| CPICH Ec/No | CPICH Received energy per chip divided by the power density in the band |
| CPRI | Common Public Radio Interface |
| CQI | Channel Quality information |
| C-RNTI | Cell RNTI |
| CSI | Channel State Information |
| DCCH | Dedicated Control Channel |
| DFS | Dynamic Frequency Selection |
| DFT | Discrete Fourier Transform |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eMBB | Enhanced Mobile BroadBand |
| eNB | E-UTRAN NodeB |
| ePDCCH | enhanced Physical Downlink Control Channel |
| EPS | Evolved Packet System |
| E-SMLC | evolved Serving Mobile Location Center |
| E-UTRA | Evolved UTRA |
| E-UTRAN | Evolved Universal Terrestrial Radio Access Network |
| FDD | Frequency Division Duplex |
| FFS | For Further Study |
| FFT | Fast Fourier Transform |
| GERAN | GSM EDGE Radio Access Network |
| gNB | gNode B (a base station in NR; a Node B supporting NR and connectivity to NGC) |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| LAA | Licensed Assisted Access |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| NGC | Next Generation Core |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PS | Packet Switched |
| PSS | Primary Synchronization Signal |
| PUCCH | Physical Uplink Control Channel |
| PUSCH | Physical Uplink Shared Channel |
| RACH | Random Access Channel |
| QAM | Quadrature Amplitude Modulation |
| RAB | Radio Access Bearer |
| RAC | Radio Access Controller |
| RAN | Radio Access Network |
| RANAP | Radio Access Network Application Part |
| RAT | Radio Access Technology |
| RF | Radio Frequency |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| RWR | Release with Redirect |
| SCH | Synchronization Channel |
| SCell | Secondary Cell |
| SCS | Subcarrier Spacing |
| SDU | Service Data Unit |
| SFN | System Frame Number |
| SGW | Serving Gateway |

-continued

| | |
|---|---|
| SI | System Information |
| SIB | System Information Block |
| SNR | Signal to Noise Ratio |
| S-NSSAI | Single Network Slice Selection Assistance Information |
| SON | Self Optimized Network |
| SS | Synchronization Signal |
| SSS | Secondary Synchronization Signal |
| TBS | Transport Block Size |
| TDD | Time Division Duplex |
| TDOA | Time Difference of Arrival |
| TOA | Time of Arrival |
| $T_s$ | Sample time/duration |
| TSS | Tertiary Synchronization Signal |
| TTI | Transmission Time Interval |
| UE | User Equipment |
| UL | Uplink |
| UMTS | Universal Mobile Telecommunication System |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| WCDMA | Wide CDMA |
| WLAN | Wide Local Area Network |

The invention claimed is:

1. A method by a network node for linear chirp detection, the method comprising:
 obtaining a first number, N, of samples of a signal;
 dividing samples into at least a first group and a second group, the first group comprising a second number, D, of the samples of the signal, the second group comprising a third number, N−D, of the samples of the signal;
 performing a correlation between the first group of samples and the second group of samples to generate a resultant group of samples of the signal,
 within the resultant group of samples, identifying a peak value in the frequency domain; and
 based on at least one property associated with the peak value, determining whether there is a linear chirp within the signal.

2. The method of claim 1, wherein determining whether there is a linear chirp within the signal based on the at least one property associated with the peak value comprises:
 comparing the peak value to a threshold;
 if the peak value is greater than or equal to the threshold, determining that there is a linear chirp within the signal; and
 if the peak value is not greater than or equal to the threshold, determining that there is not the linear chirp within the signal.

3. The method of claim 1, wherein determining whether there is a linear chirp within the signal based on the at least one property associated with the peak value comprises:
 identifying the peak value comprises calculating a peak value-to-noise floor ratio and comparing the peak value to noise floor ratio to the threshold;
 if the peak value-to-noise-floor ratio is greater than or equal to the threshold, determining that there is a linear chirp within the signal; and
 if the peak value-to-noise floor ratio is not greater than or equal to the threshold, determining that there is not a linear chirp within the signal.

4. The method of claim 1, wherein the at least one peak value comprises a value of the peak, an absolute value, or a signal-to-noise ratio (SNR).

5. The method of claim 1, wherein the resultant group of samples represents a change of phase between the first group of samples and the second group of samples after a duration.

6. The method of claim 5, wherein the duration is D divided by a sample rate.

7. The method of claim 1, further comprising:
 prior to identifying the peak value within the resultant group of samples, performing Discrete Fourier Transform, DFT or Fast Fourier Transform, FFT, on the resultant group of samples to find the peak value.

8. The method of claim 1, wherein performing the correlation between the first group of samples and the second group of samples comprises multiplying the second number, D, of the samples with a conjugate of the third number, N−D, of the samples.

9. The method of claim 1, wherein performing the correlation between the first group of samples and the second group of samples comprises performing elementwise complex multiplication of second number, D, of the samples with the third number, N−D, of the samples to generate the resultant group of samples.

10. The method of claim 9, wherein a number of samples in the resultant group is M and M is equal to D.

11. The method of any one of claim 9, further comprising padding the resultant group of samples to a nearest two power such that a number of samples in the resultant group is M and M is greater than or equal to D.

12. The method of claim 1, wherein it is determined that there is the linear chirp within the signal and wherein a width of the linear chirp is double the frequency corresponding to the peak value.

13. The method of claim 1, further comprising determining that the linear chirp is associated with a radar signal and abstaining from transmitting on a channel associated with the radar signal for a radar duration.

14. The method of claim 1, wherein it is determined that there is not the linear chirp within the signal and the method further comprises:
 in response to determining that there is not the linear chirp within the signal, transmitting on a channel associated with the signal.

15. The method of claim 1, wherein obtaining the first number, N, of the samples of the signal comprises repeatedly detecting energy for a sample duration followed by a silent period where the energy is not detected.

16. The method of claim 1, wherein obtaining the first number, N, of the samples of the signal comprises selecting the first number, N, of the samples from a larger group of N×z samples, wherein while selecting the first number, N, of the samples, every z-th sample is selected.

17. A network node for linear chirp detection, the network node comprising:
 memory storing instructions; and
 processing circuitry operable to execute the instructions to cause the network node to:
  obtain a first number, N, of samples of a signal;
  divide samples into at least a first group and a second group, the first group comprising a second number, D, of the samples of the signal, the second group comprising a third number, N−D, of the samples of the signal;
  perform a correlation between the first group of samples and the second group of samples to generate a resultant group of samples of the signal;
  within the resultant group of samples, identifying a peak value in the frequency domain; and
  based on at least one property associated with the peak value, determine whether there is a linear chirp within the signal.

18. The network node of claim 17, wherein, when determining whether there is a linear chirp within the signal based on the at least one property associated with the peak value, the processing circuitry is operable to execute the instructions to:
compare the peak value to a threshold;
if the peak value is greater than or equal to the threshold, determine that there is a linear chirp within the signal; and
if the peak value is not greater than or equal to the threshold, determine that there is not the linear chirp within the signal.

19. The network node of claim 17, wherein, when determining whether there is a linear chirp within the signal based on the at least one property associated with the peak value, the processing circuitry is operable to execute the instructions to:
identify the peak value comprises calculating a peak value-to-noise floor ratio and comparing the peak value to noise floor ratio to the threshold;
if the peak value-to-noise floor ratio is greater than or equal to the threshold, determine that there is a linear chirp within the signal; and
if the peak value-to-noise floor ratio is not greater than or equal to the threshold, determine that there is not a linear chirp within the signal.

20. The network node of claim 17, wherein the at least one peak value comprises a value of the peak, an absolute value, or a signal-to-noise ratio (SNR).

21. The network node of claim 17, wherein the resultant group of samples represents a change of phase between the first group of samples and the second group of samples after a duration.

22. The network node of claim 21, wherein the duration comprises D divided by a sample rate.

23. The network node of claim 17, wherein the processing circuitry is operable to execute the instructions to:
prior to identifying the peak value within the resultant group of samples, perform Discrete Fourier Transform, DFT, or Fast Fourier Transform, FFT, on the resultant group of samples to find the peak value.

24. The network node of claim 17, wherein, when performing the correlation between the first group of samples and the second group of samples, the processing circuitry is operable to execute the instructions to multiply the second number, D, of the samples with a conjugate of the third number, N–D, of the samples.

25. The network node of claim 17, wherein, when performing the correlation between the first group of samples and the second group of samples, the processing circuitry is operable to execute the instructions to perform elementwise complex multiplication of second number, D, of the samples with the third number, N–D, of the samples to generate the resultant group of samples.

26. A non-transitory computer-readable storage medium storing instructions operable to be executed by a processor to cause the processor to:
obtain a first number, N, of samples of a signal;
divide samples into a first group and a second group, the first group comprising a second number, D, of the samples of the signal, the second group comprising a third number, N–D, of the samples of the signal;
perform a correlation between the first group of samples and the second group of samples to generate a resultant group of samples of the signal;
within the resultant group of samples, identifying a peak value in the frequency domain; and
based on at least one property associated with the peak value, determine whether there is a linear chirp within the signal.

* * * * *